Jan. 22, 1957 W. A. MALTHANER ET AL 2,778,878

REPETITION TELEPHONE DIALING BY PULSE CODE MODULATED CARRIER

Filed April 26, 1950 14 Sheets-Sheet 1

INVENTORS W. A. MALTHANER
H. E. VAUGHAN

BY R. O. Covell

ATTORNEY

INVENTORS W.A. MALTHANER
H.E. VAUGHAN

BY R. O. Covell

ATTORNEY

Jan. 22, 1957 W. A. MALTHANER ET AL 2,778,878

REPETITION TELEPHONE DIALING BY PULSE CODE MODULATED CARRIER

Filed April 26, 1950 14 Sheets-Sheet 3

INVENTORS W. A. MALTHANER
H. E. VAUGHAN

BY R. O. Covell

ATTORNEY

INVENTORS W.A. MALTHANER
H.E. VAUGHAN
BY R. O. Covell
ATTORNEY

INVENTORS W.A.MALTHANER
H.E.VAUGHAN
BY
R. O. Covell
ATTORNEY

INVENTORS W.A. MALTHANER
H.E. VAUGHAN
BY R. O. Covell
ATTORNEY

Jan. 22, 1957 W. A. MALTHANER ET AL 2,778,878

REPETITION TELEPHONE DIALING BY
PULSE CODE MODULATED CARRIER

Filed April 26, 1950 14 Sheets-Sheet 7

INVENTORS W.A. MALTHANER
H.E. VAUGHAN
BY R. O. Covell
ATTORNEY

INVENTORS W.A. MALTHANER
H.E. VAUGHAN
BY R.O. Covell
ATTORNEY

INVENTORS W.A. MALTHANER
H.E. VAUGHAN
BY R. O. Covell
ATTORNEY

INVENTORS W.A. MALTHANER
H.E. VAUGHAN
BY R. O. Covell
ATTORNEY

SAMPLING COMMUTATOR CIRCUIT 30

INVENTORS W.A. MALTHANER
H.E. VAUGHAN
BY
R. O. Covell
ATTORNEY

INVENTORS W. A. MALTHANER
H. E. VAUGHAN
BY
R. O. Covell
ATTORNEY

SIGNAL RECEIVER WAVE FORMS

INVENTORS: W. A. MALTHANER
H. E. VAUGHAN
BY R. O. Covell
ATTORNEY

INVENTORS W. A. MALTHANER
H. E. VAUGHAN
BY
R. O. Covell
ATTORNEY 2,778,878

REPETITION TELEPHONE DIALING BY PULSE CODE MODULATED CARRIER

William A. Malthaner, New Providence, and Henry E. Vaughan, Chatham, N. J., assignors to Bell Telephone Laboratories, Incorporated, New York, N. Y., a corporation of New York Application April 26, 1950, Serial No. 158,218

23 Claims. (Cl. 179—18)

This invention relates to signaling and particularly to high-speed selective code signaling adapted for use between common control circuits in automatic telephone systems.

Objects of the invention are the rapid transmission of items of information, including the transmission of telephone directory and toll routing numbers between telephone offices, and an increased efficiency in the use of common control units between which the transmission occurs.

In telephone switching systems comprising automatic switches and register-sender circuit means for controlling the completion of connections between calling and called subscriber stations, telephone office code and subscriber numbers registered in an originating office are transmitted to intermediate and terminating offices to be registered therein for use in controlling the required switching operations. In order to minimize the times required for transmitting such numbers, signal codes of a number of different characteristics have been used including pulse code amplitude modulated signals. This invention is a signaling arrangement in which letter and numerical code digits are transmitted by means of double sideband carrier current signals produced by pulse code amplitude modulation without synchronization of the carrier current sources and without excessive low frequency phase distortion or excessive frequency shift. A feature of the invention is a signal transmitter arranged to start the transmission of signals immediately after all of the information which is to be transmitted has been registered and to cyclically repeat the sending until a stop signal is received, a start signal and synchronizing signal being transmitted at the beginning of each cycle. According to this feature, the signal transmitter comprises in combination with settable registers of conventional type, an electronic timing impulse source, continuously operating electronic coding and digit steppers and code gates for producing coded signal impulses which modulate carrier current to effect the transmission of carrier current signals over an interoffice trunk.

Another feature of the invention is the provision of signal responsive means associated with a transmitter according to the preceding paragraph for stopping the transmission of the carrier current signals when the transmitted carrier current signals have been decoded and registered at the distant end of the trunk.

Another feature of the invention is a signal receiver selectively responsive to pulse code, amplitude modulated, double sideband, carrier current signals including start, synchronizing and letter and numerical digit signals. According to this feature, the signal receiver includes a detector responsive to pulse code, amplitude modulated, double sideband, carrier current signals, a decoding control circuit, a steering circuit, a sampling commutator, a digit decoding and registering and checking circuit, and a code recording and recoding circuit.

Another feature of the invention is the provision of carrier current signal transmitting means associated with a signal receiver according to the preceding paragraph for transmitting a stop sending signal to stop the cyclic transmission of carrier current signals from the originating end of the trunk over which signals are being received.

A further feature is a signaling arrangement comprising signal transmitting means for cyclically transmitting coded digit signals under the control of variably settable registers over a line to a signal receiver adapted to respond thereto, the signal receiver being connected to the line responsive to completion of the setting of the registers which control the transmitter.

These and other features of the invention are embodied in the system shown schematically in the drawing which consists of fifteen figures. The invention is, however, not limited in application to the system shown but is generally applicable to signaling systems requiring the rapid transmission of a plurality of intelligence items.

Referring to the drawing.

Figure 7:
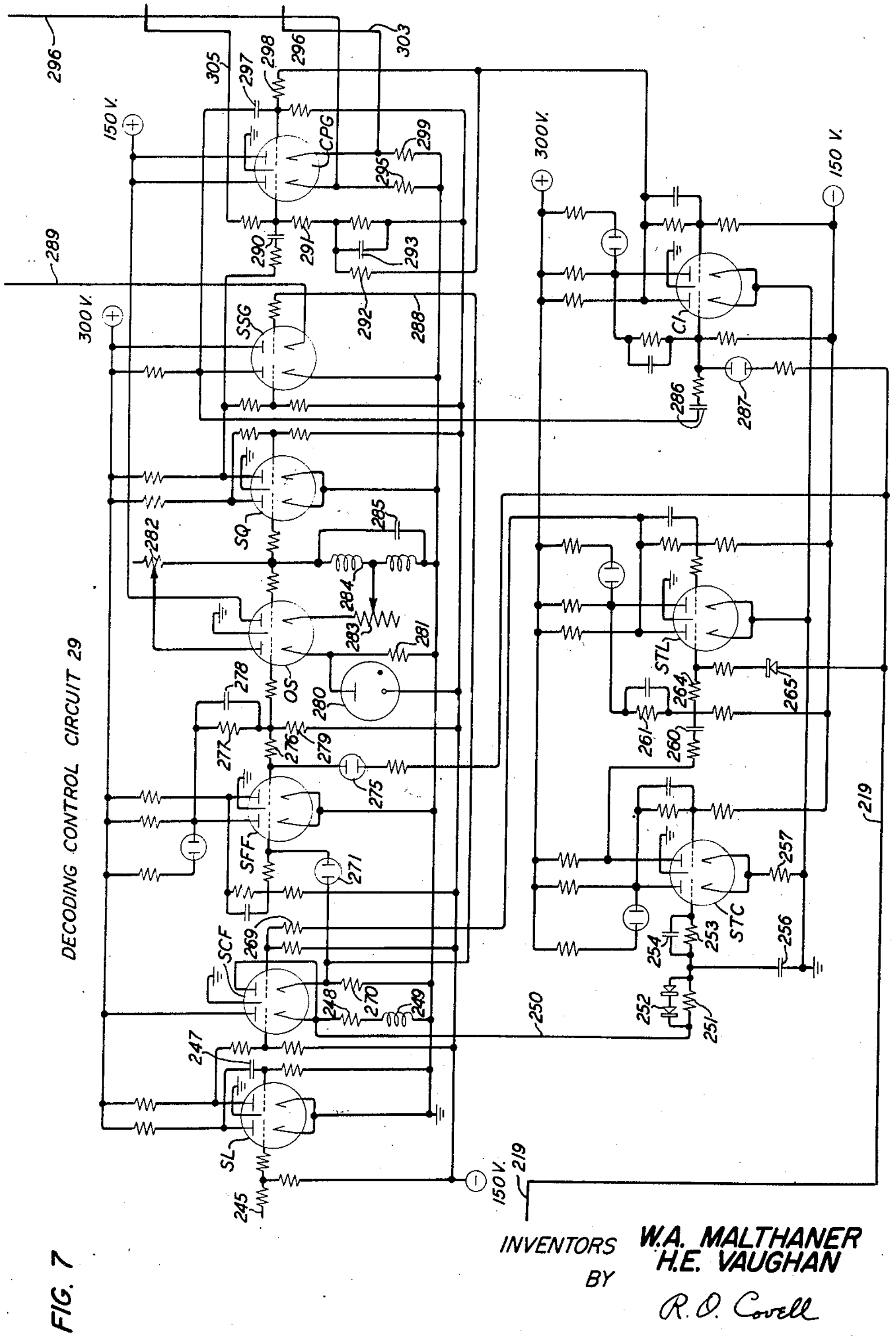
Figure 8:
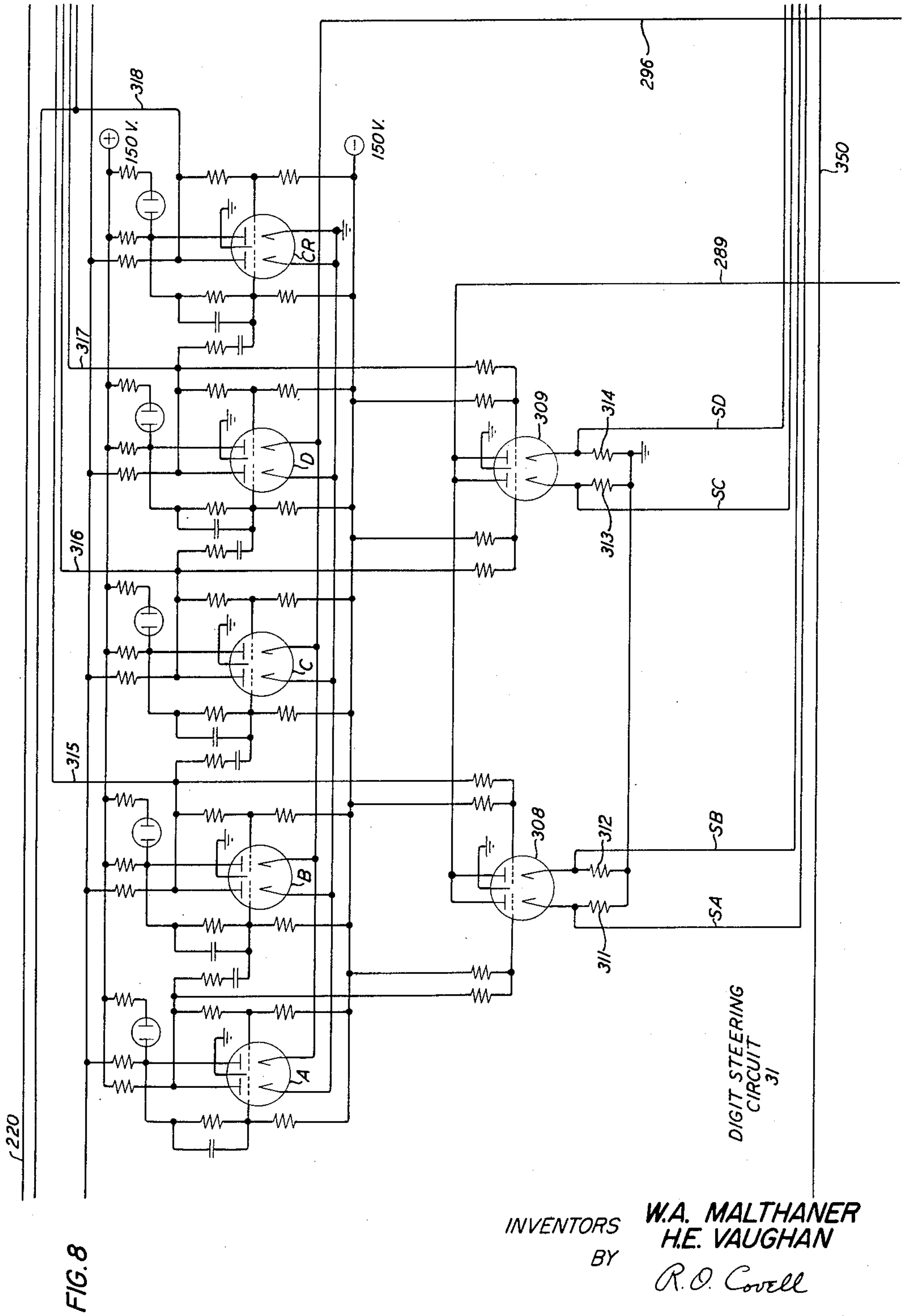
Figure 15:
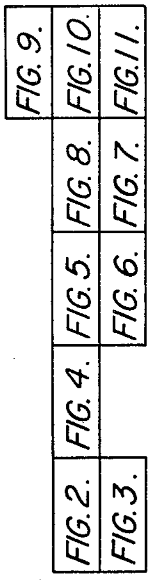
Figure 12:
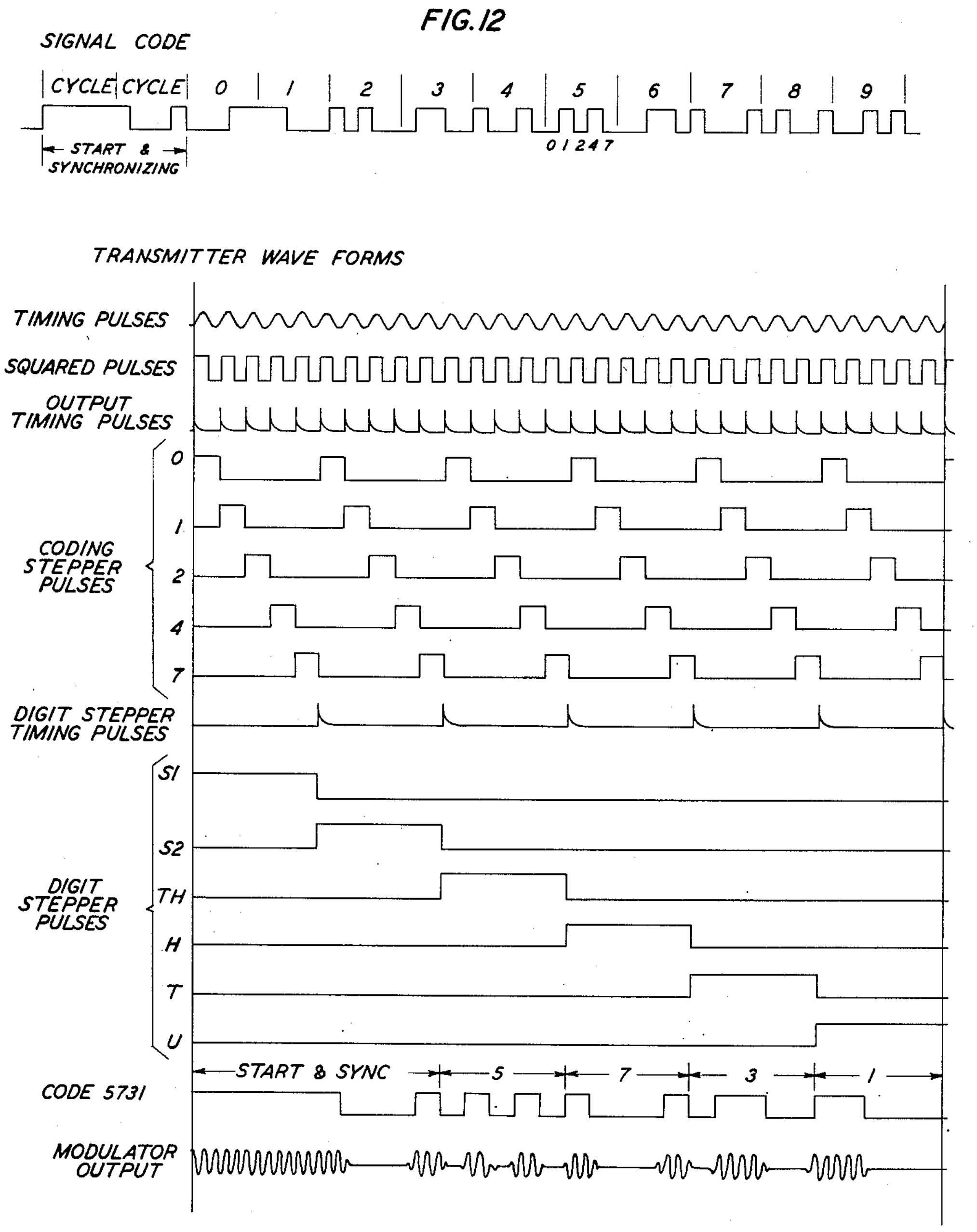
Figure 13:
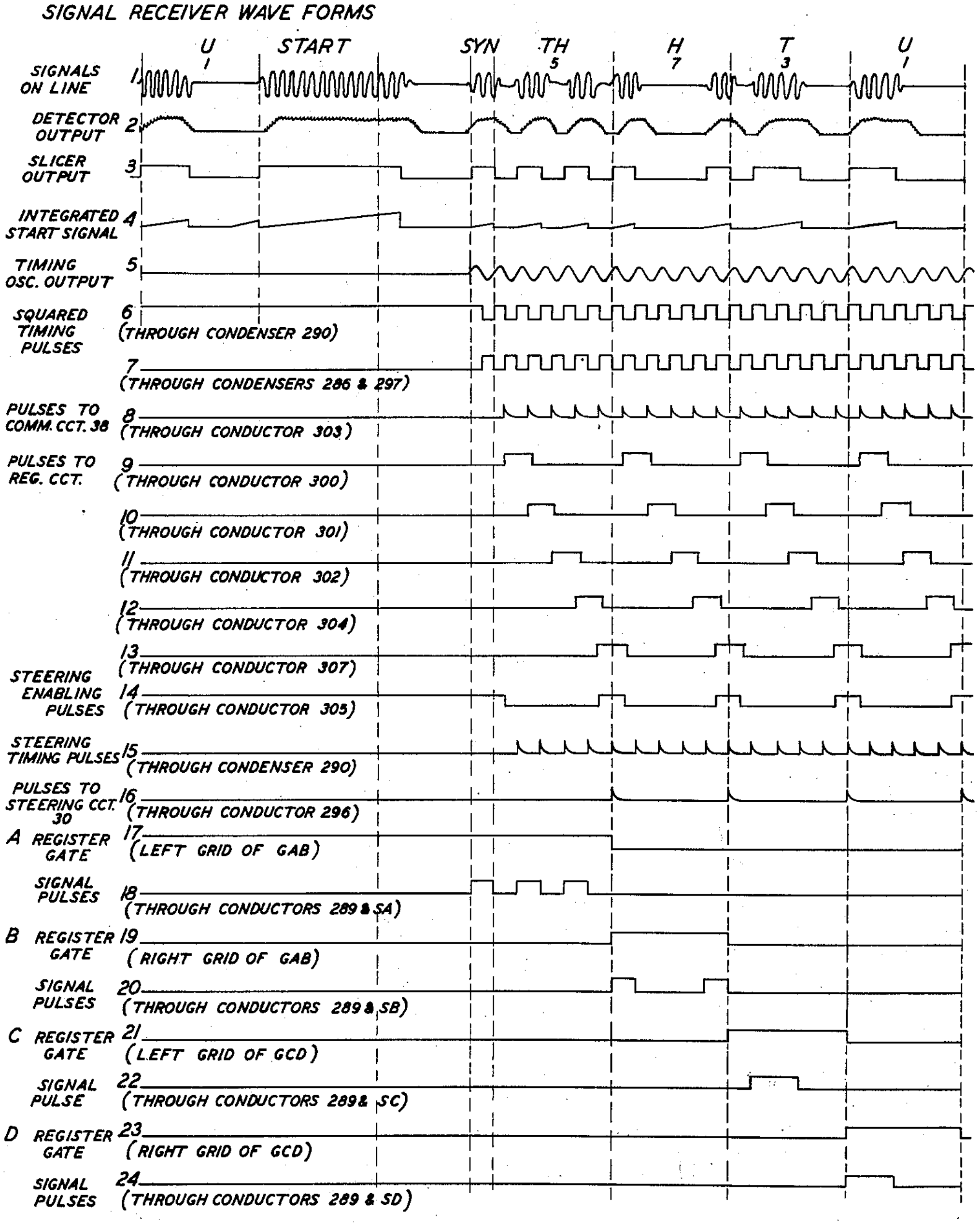
Figure 14:
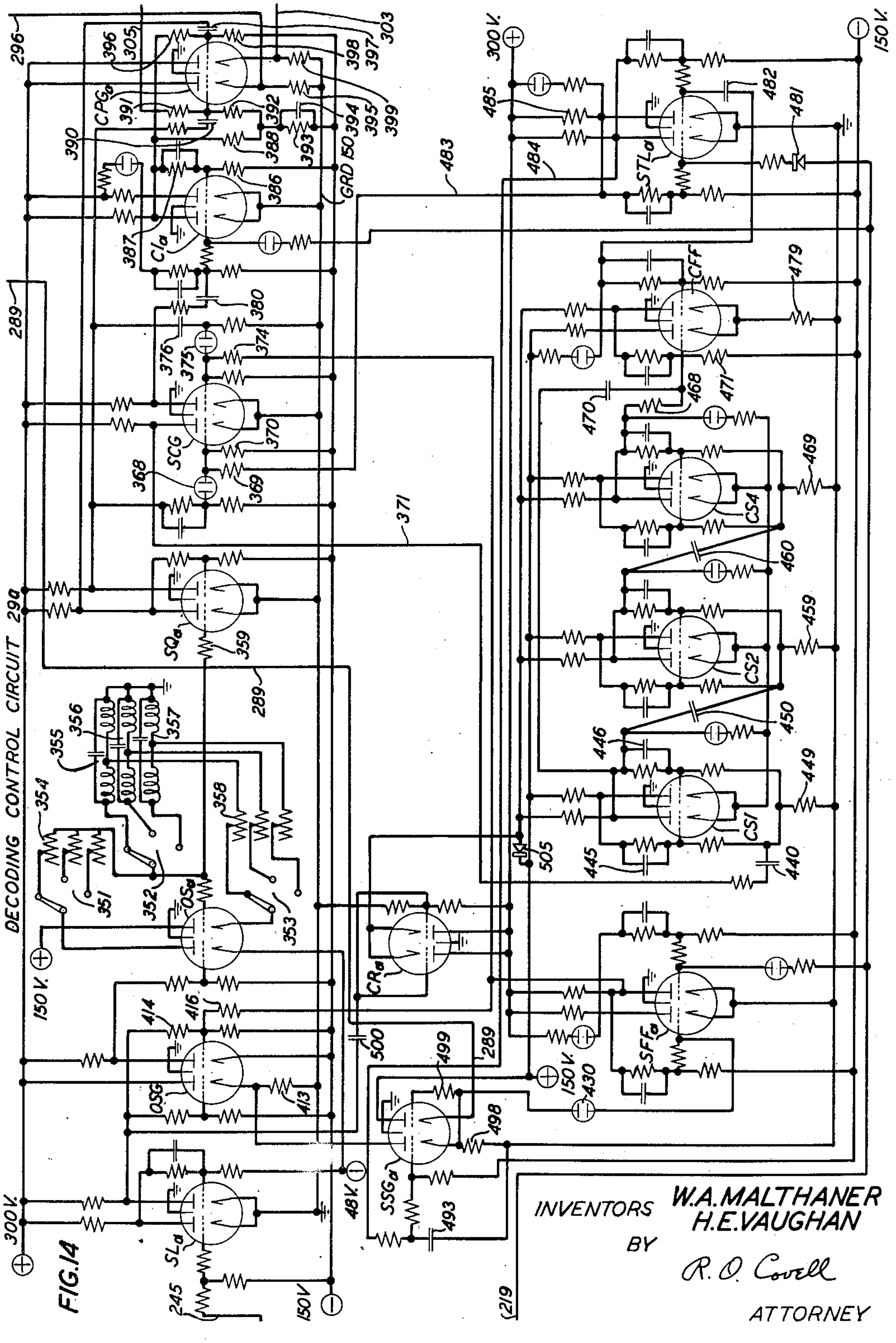

Figs. 5 to 11 inclusive represent signal receiving and registering means for receiving and registering office code and subscriber numbers incoming over trunks from originating or tandem offices;

Figs. 12 and 13 show graphically the code employed for signal transmission, the character of the carrier current, start, synchronizing and digit signals and voltage wave forms in various parts of the signal transmitting and signal receiving circuits;

Fig. 14 shows a preferred form of decoding control circuit for use in place of the decoding control circuit shown in Fig. 7; and Fig. 15 shows the relative position in which Figs. 2 to 11 are to be placed to constitute operative circuit arrangements.

Figure 1:
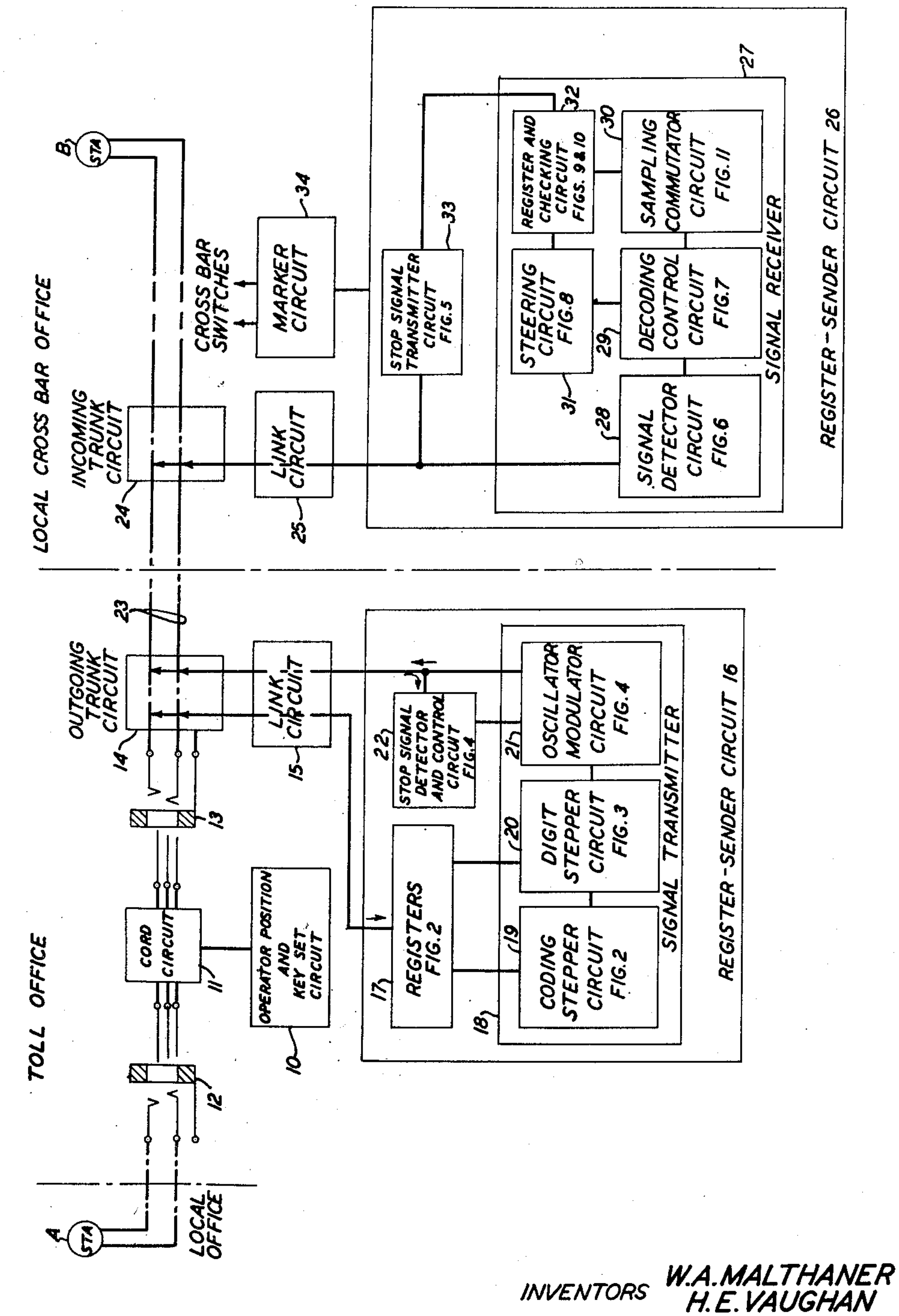
Fig. 1 is a schematic block diagram representing a multi-office telephone system comprising register controlled switching devices for establishing desired telephone connections.

The telephone system shown schematically in Fig. 1 comprises a local office of any known type which is represented by a calling subscriber station A, a toll office and a cross-bar local office. The toll office is represented by an operator position and key-set circuit 10, a cord circuit 11, jacks 12 and 13, an outgoing trunk circuit 14 interconnecting jack 13 and a two-conductor trunk 23, a link circuit 15, and an operator's register-sender circuit 16. The register-sender 16 is of the type disclosed in detail in Patent 1,780,906, granted to W. W. Carpenter and R. E. Hersey, November 11, 1930, and includes digit registers set in response to key-set impulses transmitted from the operator's key-set circuit. The digit registers 17, which may be relay registers as shown in the Carpenter-Hersey patent, are shown schematically in Fig. 2 of the drawing as being rotary switch registers and may represent any known type of registers. The signal transmitter 18 which comprises a coding stepper circuit 19, a digit stepper circuit 20, and an oscillator-modulator circuit 21, replaces the signal sending part of the register sender shown in the Carpenter-Hersey patent and is disclosed in detail in Figs. 2, 3 and 4 of the drawings. Since the signal transmitter is arranged to cyclically transmit and repeat the coded digit signals corresponding to the setting of the registers, the register-sender 16 includes a stop signal detector and control circuit 22 which responds to a stop signal from the terminating office to stop the transmission of the digit signals by the transmitter 18.

The local cross-bar office is represented by an incoming trunk circuit 24 to which trunk 23 is connected, a link circuit 25, a register-sender circuit 26, a marker circuit 34, and cross-bar switches (not shown) for extending the connection to a called subscribed station B. Reference may be had to Patent 2,089,921, granted August 10, 1937, to W. W. Carpenter for a detailed description of the operation of incoming trunk, link, register-sender and marker circuits and cross-bar switches in establishing a connection from a trunk to a called subscriber line. The register-sender 26 is a modification of the register sender shown in the Carpenter patent and comprises a signal receiver 27 and a stop signal transmitter 33. The signal receiver 27 consists of a signal detector circuit 28, a decoding control circuit 29, a sampling commutator circuit 30, a steering circuit 31, and a register and checking circuit 32. These circuits are shown in detail in Figs. 5 through 11 as indicated in Fig. 1.

The general operation of the system will first be described, referring to Fig. 1; and detailed descriptions of the operations of the circuits shown in Figs. 2 through 11 will follow the general description.

Assume a toll call to have been initiated at station A in a local office and extension of a connection from the calling line over a trunk to the toll office, the call being answered by connection of one end of cord circuit 11 to answering jack 12. The answering toll operator receives the called office code and subscriber number from the calling subscriber and connects the other end of cord 11 to a jack 13 associated with a trunk 23 to the called office which in this case is assumed to be a local cross-bar office. Responsive to the connection of cord circuit 11 to jack 13, the associated outgoing trunk circuit 14 is connected by operation of a link circuit 15 to an idle register-sender circuit 16. When a register-sender circuit 16 is attached to trunk circuit 14, a sender-attached signal is transmitted to the key-set circuit, lighting a sender-attached lamp to indicate that keying of the digits may be started. The operator thereupon depresses the keys one at a time in succession corresponding to the digits to be transmitted, whereby the registers 17 are operated to register the keyed digits. The register-sender circuit 16 is cognizant of the character of the trunk to which it is connected and, as soon as all of the registers which are required for the call in question have been set, a signal is transmitted from the register sender to the key-set circuit to indicate that the key-set circuit may be disconnected from the cord circuit 11; and at the same time a connect or seizure signal is transmitted over trunk 23 to incoming trunk circuit 24 to effect the operation of a link circuit 25 to connect this incoming trunk circuit to an idle register-sender circuit 26. Without waiting for a register-sender circuit to be connected to the trunk circuit 24 in the cross-bar office, the signal transmitter 18 transmit coded signals corresponding to the setting of the registers over trunk 23. The coded digit signals are cyclically repeated, a start signal and a synchronizing signal being transmitted at the beginning of each cycle. The coded signals consist of double sideband carrier current impulses in accordance with the two-out-of-five pulse position code illustrated at the top of Fig. 12. Any other code, for instance a binary code might be used, the signal transmitting and receiving circuits being arranged in accordance with the code desired. Called number signals are received by the register-sender circuit 26 as soon as it is connected to incoming trunk circuit 24; and as soon thereafter as start and synchronizing signals are transmitted by signal transmitter 18 and received by the signal detector circuit 28, the succeeding coded digit signals are rendered effective by operation of the decoding control circuit 29, sampling commutator circuit 30, and steering circuit 31 to register the digits corresponding to the coded signals in the registering and checking circuit 32. If all of the digit signals appear to be correct and complete, the checking circuit renders the stop signal transmitter circuit 33 effective to transmit a stop signal consisting of tone, for instance 1800 cycles per second, over trunk 23 to energize the stop signal detector and control circuit 22 in register-sender 16, thereby to terminate the transmission of signals by signal transmitter 18. The register-sender circuit 16 is thereupon disconnected from trunk circuit 14 and the switches in the cross-bar office are operated under the control of marker circuit 34 to extend the connection to the called line identified by the setting of the registers in the register and checking circuit 32 in the manner described in detail in the aforementioned patent to W. W. Carpenter.

Figure 2:
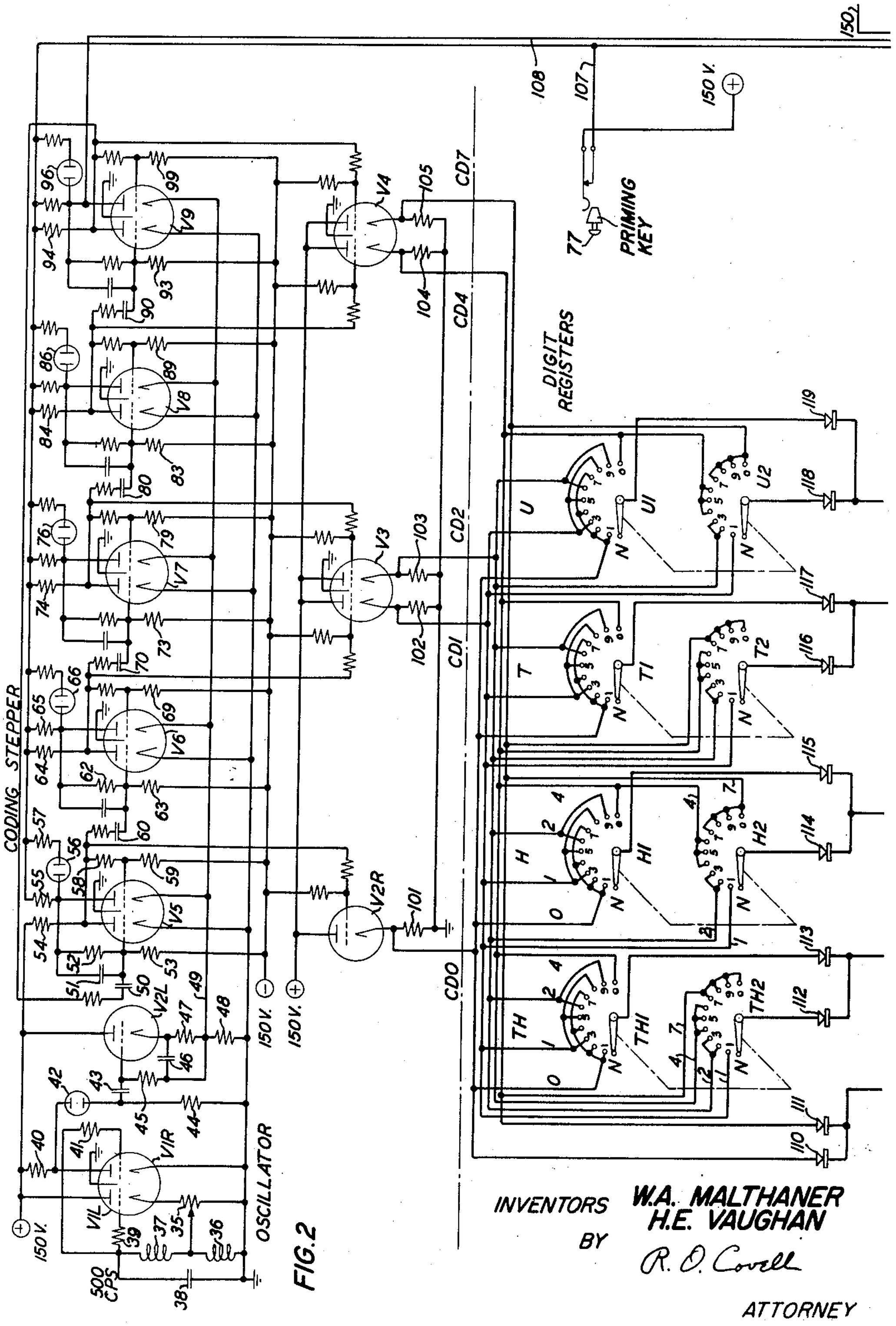
Figs. 2, 3 and 4 represent register-sender means in one of the offices arranged to transmit called office codes and subscriber number over trunks to tandem or terminating offices.
Figure 3:
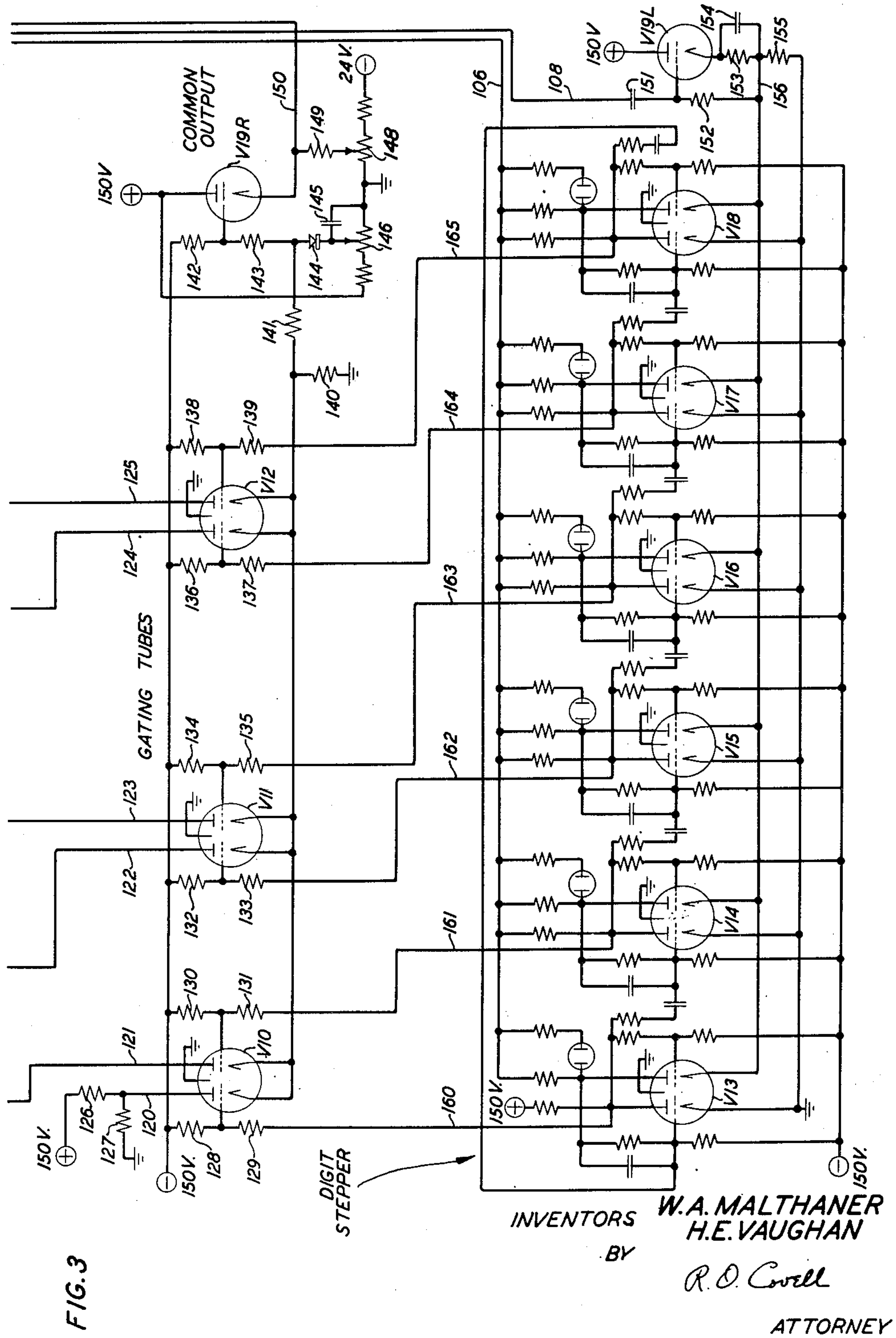

The operation of the signal transmitter 18 and signal receiving circuit of register-sender circuit 16 and the operation of the signal receiver 27 and signal transmitter circuit 33 of register-sender circuit 26 will now be described in detail. As above stated, the registers in register-sender circuit 16 are represented in Fig. 2 by rotary switches, one for each digit. Only four registers are shown, representing the thousands, hundreds, tens, and units digits of a subscriber number. Additional registers would be provided for office code digits and also for toll route numbers in register-sender circuits arranged for nationwide dialing. Although the registers are shown in normal position, we will assume that the number registered thereon is 5731.

The coding stepper circuit shown in Fig. 2 comprises nine double-triode vacuum tubes, V1 to V9, the cathode heating elements of which are not shown in the drawing. The left triodes of tubes V1 and V2 are designated V1L and V2L and the right triodes V1R and V2R; and such a distinction will be used herein for all double triodes although not so marked in the drawing. It will be noted that separate envelopes are shown for the two triodes V2L and V2R in order to group the triode V2R with tubes V3 and V4. 24-volt, 48-volt and 150-volt potential sources are represented by a circle, the polarity of the source with respect to ground being indicated by + or − sign within the circle. The triode V1L is an oscillator, the grid and cathode circuit being tuned by inductors 36 and 37 and capacitor 38 to oscillate at a desired frequency, for instance 500 cycles per second. Since the digit code used in the system shown is a two-out-of-five pulse position code, the coded digit signals will be transmitted at the rate of 100 digits per second if the oscillator V1L is tuned to 500 cycles per second. The output of oscillator V1L is applied to the grid of triode V1R to produce a square wave train output which is applied through gas-filled diode 42, a differentiating network comprising capacitor 43 and resistor 45 and the cathode-follower triode V2L to the coding stepper tubes V5 to V9. The diode 42 steepens the rise in voltage of each square wave pulse so as to increase the amplitude of the pulse passed by the differentiating network without increasing the pulse duration. The five tubes V5 to V9 constitute a five-stage coding stepper controlled by the pulses from the oscillator, the tubes being cyclically energized in succession, the right triode of only one of the tubes and the left triode of each of the other tubes being energized at one time. In this description a triode is said to be energized when there is current in the anode-cathode circuit and is said to be deenergized when the grid bias is sufficiently negative so that there is substantially no current in the anode-cathode circuit. An indicator comprising a two-element neon-filled tube is connected for energization in the anode circuit of the right triode of each tube to indicate which of the tubes is energized, that is the particular tube in which the right triode is energized. These tubes are designated 56, 66, 76, 86 and 96. The output circuit of triode V2L includes a resistor 48 and the voltage developed across this resistor each time triode V2L is energized is applied through conductor 49 to the right cathode of each of tubes V5 to V9, thereby driving these cathodes sufficiently positive to cause the deenergization of any energized one of the triodes V5R, V6R, V7R, V8R and V9R. A priming key 77 controls the connection of the 150-volt positive potential source to the right anode of tube V5 and both anodes of each of tubes V6 to V9; and this key is momentarily depressed one or more times to start the cyclic operation of tubes V5 to V9 in case the operation has been stopped, for instance by failure of either or both of the 150-volt potential sources. When these sources are originally connected, or are thereafter reconnected, the oscillator triode is energized and pulses are transmitted through triodes V1R and V2L; but there is an uncertainty as to which triodes of tubes V6 to V9 will become energized and, although the constants of the circuit favor the initial energization of the right triode of tube V5 and the left triode of each of tubes V6 to V9, one or more momentary operations of priming key 77 may be required to start the stepper operation. While key 77 is depressed, all the grids of tubes V5 to V9 other than the grid of triode V5R assume a potential 150 volts negative with respect to ground, while the potential of the grid of triode V5R is somewhat less negative with respect to ground due to the voltage developed across resistor 59. Consequently as soon as the release of key 77 effects the reconnection of the 150-volt positive potential to conductor 107, at a time when there is no current through triode V2L and resistor 48, the triode V5R immediately becomes energized; and although all of the grids of tubes V6 to V9 become somewhat less negative due to development of a potential difference across each of resistors 63, 69, 73, 79, 83, 89, 93 and 99 the voltage developed across resistor 48 makes the cathode of each of triodes V6R, V7R, V8R and V9R more positive and consequently the left triodes V6L, V7L, V8L and V9L become energized. When triode V5R becomes energized, the anode becomes more negative due to the drop in potential developed across resistor 55, and consequently the grid of triode V5L is maintained at a sufficiently negative potential with respect to the cathode to prevent energization of triode V5L. Since the anodes of the left triodes of tubes V6 to V9 also become more negative due to the drop in potential developed across each of resistors 64, 74, 84 and 94, the grids of V6R, V7R, V8R and V9R are maintained at a sufficiently negative potential with respect to the cathodes to prevent energization of these triodes. Thus we have triodes V5R, V6L, V7L, V8L and V9L energized, and triodes V5L, V6R, V7R, V8R and V9R deenergized. As soon after the energization of the triode V5R as a positive pulse is developed across resistor 48 in the output circuit of the cathode-follower triode V2L, the positive pulse transmitted through conductor 49 causes the denergization of triode V5R, the resulting increase in the positive potential of the anode of V5R being effective to reduce the negative potential on the grid of triode V5L sufficiently to energize triode V5L. The energization of triode V5L decreases the positive potential of its anode, thus transmitting a negative pulse through condenser 60 to the grid of triode V6L, thereby causing triode V6L to be deenergized; whereby the anode of triode V6L becomes more positive and so also the grid of triode V6R to cause the energization of triode V6R. The deenergization of triode V6L and increase in the positive potential of its anode also causes the transmission of a positive pulse through condenser 70 to the grid of triode V7L without further effect since this triode is already energized. The next pulse through cathode-follower V2L causes the deenergization of triode V6R and the reenergization of triode V6L whereby a negative pulse is transmitted through condenser 70 to the grid of triode V7L to deenergize triode V7L and cause the energization of triode V7R. The next positive pulse produced across resistor 48 effects the deenergization of triode V7R, the reenergization of triode V7L, the deenergization of triode V8L and the energization of triode V8R. The next positive pulse produced across resistor 48 effects the deenergization of triode V8R, the reenergization of triode V8L, the deenergization of V9L and the energization of V9R. The next positive pulse produced across resistor 48 causes the deenergization of triode V9R, the reenergization of triode V9L, the deenergization of V5L and the reenergization of V5R.

Thus a second cycle of operation of the stepper tubes V5, V6, V7, V8 and V9 has been started and these tubes continue to be energized and deenergized in succession one cycle after the other under control of pulses generated by oscillator triode V1L. Since the frequency of the timing pulses is 500 cycles per second, each cycle of the coding stepper is .010 second in length; and during each cycle the right triode of each stage in succession is energized for .002 second and deenergized for .008 second. The five triodes V2R, V3L, V3R, V4L and V4R are cathode followers, controlled by the five stages of the coding stepper. When triode V5R becomes energized and V5L is deenergized, a positive potential is applied from the anode of triode V5L to the grid of cathode-follower triode V2R; and .002 second later, when triode V5R is deenergized and triode V5L energized, the potential of the grid of V2R becomes sufficiently negative to deenergize the triode V2R. Likewise, cathode-follower triodes V3L, V3R, V4L and V4R are each energized in succession during the .002 second interval that the corresponding one of triodes V6R, V7R, V8R and V9R are energized. The cycle energization of these cathode-follower triodes one at a time in succession develops a drop in potential across resistors 101, 102, 103, 104 and 105 in succession, thereby cyclically applying a positive potential to each of five coding conductors CD0, CD1, CD2, CD4 and CD7 one at a time in succession. These coding conductors are connected to the various terminals of the digit register switches to effect the transmission of coded digit pulses to the grids of gating tubes V10 to V12, each digit from 0 to 9 being represented by a different two-out-of-five pulse position additive code as illustrated in Fig. 12. Thus if, as previously assumed, the number 5731 has been registered, a positive pulse is transmitted through coding conductor CD1, terminal 5, wiper TH1, rectifier 113 and conductor 122 to the anode of the gating triode V11L during the second pulse position and another positive pulse is transmitted through coding conductor CD4, terminal 5, wiper TH2, rectifier 112 and conductor 122 to the anode of gating triode V11L during the fourth pulse position of each cycle of the coding stepper subsequent to the setting of the TH register; a positive pulse is transmitted through coding conductor CD0, terminal 7, wiper H1, rectifier 115 and conductor 123 to the anode of gating triode V11R during the first pulse position and another positive pulse is transmitted through coding conductor CD7, terminal 7, wiper H2, rectifier 114 and conductor 123 to the anode of gating triode V11R during the fifth pulse position of each cycle of the coding stepper subsequent to the setting of the H register; a positive pulse is transmitted through coding conductor CD1, terminal 3, wiper T1, rectifier 117 and conductor 124 to the anode of gating triode V12L during the second pulse position and another positive pulse is transmitted through coding conductor CD2, terminal 3, wiper T2, rectifier 116 and conductor 124 to the anode of gating triode V12L during the third pulse position of each cycle of the coding stepper subsequent to the setting of the T register; and a positive pulse is transmitted through coding conductor CD0, terminal 1, wiper U1, rectifier 119 and conductor 125 to the anode of gating triode V12R during the first pulse position and another positive pulse is transmitted through coding conductor CD1, terminal 1, wiper U2, rectifier 118 and conductor 125 to the anode of gating triode V12R during the second pulse position of each cycle of the coding stepper subsequent to the setting of the U register. In addition, a positive pulse is transmitted through coding conductor CD0, rectifier 110 and conductor 121 to the anode of gating triode V10R during the first pulse position and another positive pulse is transmitted through coding conductor CD7, rectifier 111 and conductor 121 to the anode of gating triode V10R during the fifth pulse position of each cycle of the coding stepper, the first position pulse constituting part of a start signal and the fifth position pulse constituting a synchronizing signal. The anode of gating triode V10L is permanently connected to the positive 150-volt source, to constitute the first five positions of the start signal which together with the positive pulse transmitted to the grid of triode V10R during the first position of the next cycle of the coding stepper forms a six-pulse position start signal as hereinafter further described.

Figure 4:
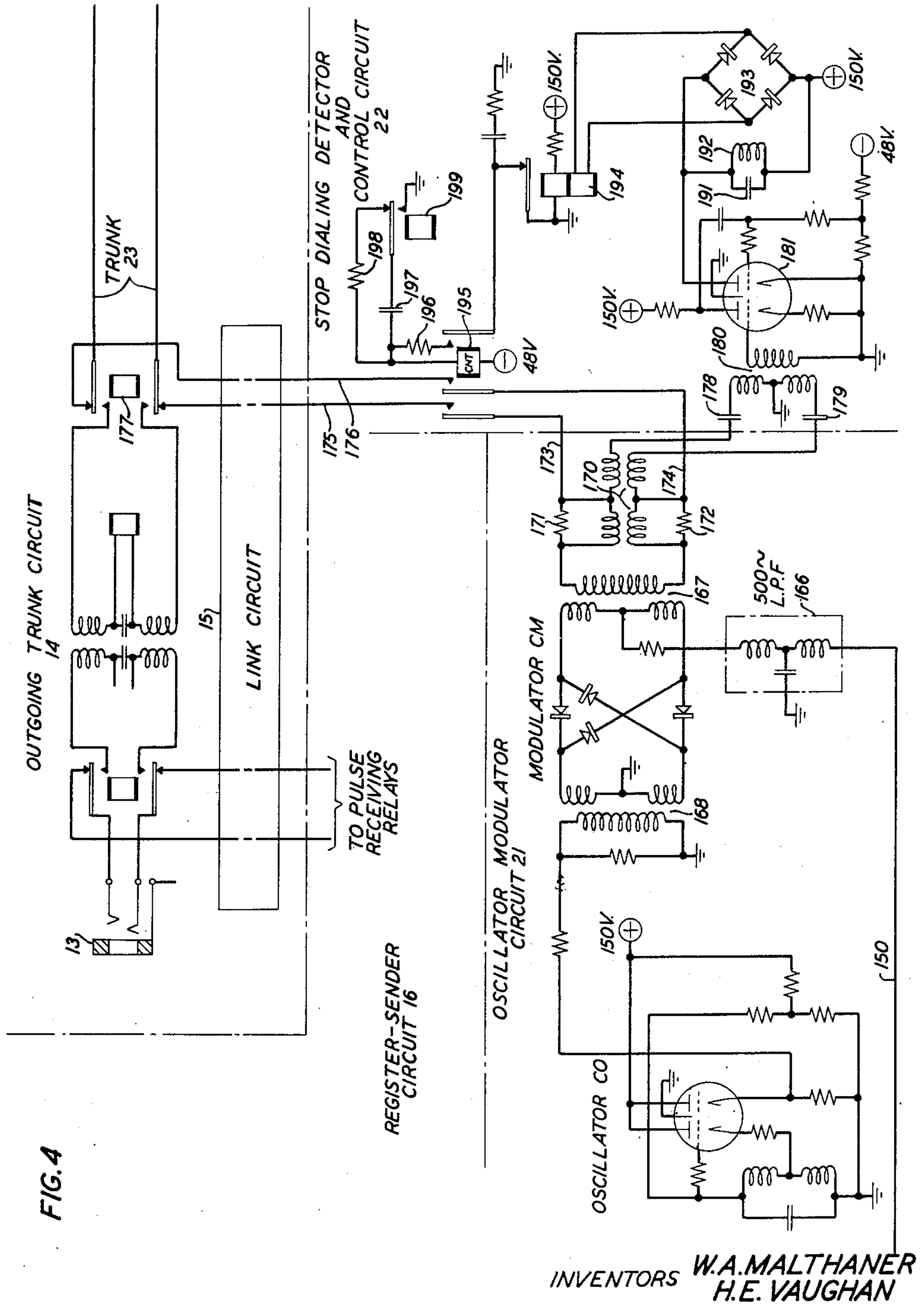

The double-triode gating tubes V10 to V12 are cyclically energized, one triode at a time in succession under the control of the digit stepper tubes V13 to V18 so that the start and synchronizing pulses and coded digit pulses are transmitted in succession through resistor 140 and through resistor 141 to the common output triode V19R thence over conductor 150 to the modulator circuit 21 shown in Fig. 4.

The digit stepper tubes V13 to V18 form a reentrant ring, similar to the coding stepper above described except that it is a six-stage ring instead of a five-stage ring, one stage for each triode of gating tubes V10 to V12. The digit stepper is advanced one stage each time the coding stepper completes a cycle, the advance from any stage to the next being effected by a positive pulse transmitted from the anode of triode V9R when this triode is deenergized through conductor 108 and condenser 151 to the grid of triode V19L which is similar in connection and functions with respect to tubes V13 to V18 to that of triode V2L with respect to tubes V5 to V9, as above described. The anode of triode V13L is directly connected to the positive 150-volt source but triode V13R and both triodes of each of tubes V14 to V18 are connected to this source through the contact of priming key 77, so that the digit stepper may be set in operation by momentary operation of key 77 as above described with respect to the code stepper. Assuming operation to have been started by momentary operation of key 77, triode V13R is energized and the left triode of each of tubes V14 to V18 is energized. When a cycle of operation of the code stepper is completed, the positive pulse transmitted when triode V9R is deenergized, causes the energization of V19L; and the drop in potential through resistor 155 in the anode-cathode circuit effects the application of a positive potential through conductor 156 to the right cathode of each of tubes V13 to V18, thereby causing the deenergization of triode V13R, the energization of triode V13L, the transmission of a negative pulse from the anode of triode V13L, to the grid of triode V14L, the deenergization of triode V13L and the energization of triode V14R. In like manner each time a cycle of operation of the code stepper is completed, the right triodes of tubes V14 to V18 are energized and deenergized one at a time in succession; and, when triode V18R is deenergized and V18L reenergized, triode V13L is deenergized and V13R is again energized, starting another cycle of operation of the digit stepper.

The grid of the pulse output triode V19R is biased by the connection of the negative 150-volt source to resistor 142, and the drop in potential through resistor 140 when one of the gating triodes is energized permits current in the anode-cathode circuit of triode V19R so that a positive potential pulse is transmitted from the anode-cathode circuit of triode V19R, through conductor 150 to modulator circuit 21 whenever a start signal pulse, a synchronizing signal pulse or a digit signal pulse is being transmitted through gating triodes V10L to V12R. The potentiometer 146, rectifier 144 and condenser 145 constitute a biased voltage limiting circuit which controls the maximum amplitude of the signals applied to the grid of the cathode-follower V19R so that each output pulse applied to conductor 150 is of the same amplitude, although the voltage pulses developed across resistor 140 may vary in amplitude. The potentiometer 148 allows adjustment of the base line of the output pulses.

Each time the digit stepper triode V13R is energized and the triode V13L is deenergized, a positive potential is applied through conductor 160 to the grid of gating triode V10L whereby current from the positive 150-volt source through resistor 126, conductor 120, anode and cathode of triode V10L and resistor 140 changes the potential of the grid of triode V19R whereby a positive output pulse is applied to conductor 150 during each of the five pulse positions of the cycle of the coding stepper which takes place while digit stepper triode V13L is deenergized. When triode V13R is deenergized and triode V13L is reenergized, a negative potential is applied through conductor 160 to the grid of triode V10L to close this gate and stop current in the anode-cathode circuit of triode V10L; when triode V14L is deenergized and triode V14R is energized, a positive pulse is applied through conductor 161 to the grid of gating triode V10R to open this gate, thus rendering triode V10R effective to transmit through resistor 140 the positive pulse which is applied through conductor 121 to the anode of triode V10R during the first pulse position of the cycle of the coding stepper which takes place while digit stepper triode V14R is energized; and a corresponding pulse is transmitted through triode V19R and conductor 150 to continue the start signal pulse for another pulse position making the start signal, transmitted to modulator circuit 21, six pulse positions (0.12 second) in length. During the next three pulse positions of the same cycle of the coding stepper, the anode gating triode V10R is negatively biased beyond cut-off; but during the fifth pulse position, a positive potential is applied through conductor 121, anode and cathode of gating triode V10R and resistor 140, whereby a synchronizing signal one pulse position in length is transmitted through conductor 150 to the modulator circuit 21. When digit stepper triode V14R is deenergized and triode V14L is reenergized, the gate through triode V10R is closed due to application of negative potential to conductor 161; when triode V15L is deenergized and triode V15R energized, the gate through triode V11L is opened by application of a positive potential to conductor 162; and positive pulses are transmitted according to the setting of the TH register through conductor 122 and triode V11L, to the grid of triode V19R; and like pulses are transmitted therefrom through conductor 150 to modulator circuit 21. When digit stepper triode V15R is deenergized and triode V15L is reenergized, the gate through triode V11L is closed due to application of negative potential to conductor 162; when triode V16L is deenergized and triode V16R energized, the gate through triode V11R is opened by application of a positive potential to conductor 163; positive pulses are transmitted according to the setting of the H register through conductor 123 and triodes V11R to the grid of triode V19R; and like pulses are transmitted therefrom through conductor 150 to modulator circuit 21. When digit stepper triode V16R is deenergized and triode V16L is reenergized, the gate through triode V11R is closed due to application of a negative potential to conductor 163; when triode V17L is deenergized and triode V17R energized, the gate through triode V12L is opened by application of a positive potential to conductor 164; positive pulses are transmitted according to the setting of the T register through conductor 124 and triode V12L to the grid of triode V19R; and like pulses are transmitted therefrom through conductor 150 to modulator circuit 21. When digit stepper triode V17R is deenergized and triode V17L is reenergized, the gate through triode V12L is closed due to the application of a negative potential to conductor 164; when triode V18L is deenergized and triode V18R energized, the gate through triode V12R is opened by application of a positive potential to conductor 165; positive pulses are transmitted according to the setting of the U register through conductor 125 and triode V12R to the grid of triode V19R; and like pulses are transmitted therefrom through conductor 150 to modulator circuit 21. Thus during each cycle of the digit stepper following the setting of the digit registers, start signal, synchronizing signal and digit signal pulses are transmitted through gating tubes V10 to V12 to the grid of the common output triode V19R; and corresponding direct-current pulses are transmitted through conductor 150 to the oscillator-modulator circuit 21.

When all of the registers in the register-sender circuit 16 which are used on the call have been set, a relay 199 operates, this relay corresponding to relay 805 of the register sender in the aforementioned patent to Carpenter and Hersey. The operation of relay 199 closes a circuit including condenser 197 for operatively energizing the winding of relay 195; and relay 195 locks through resistor 196 under control of relay 194. The operation of relay 195 connects the output conductors 173 and 174 of modulator CM in the oscillator-modulator circuit 21 through conductors 175 and 176 and back contacts of relay 177 in the outgoing trunk circuit 14 to the conductors of trunk 23. The connection of the right winding of transformer 167 across trunk 23 causes the operation of line relay 5802 in the incoming trunk circuit 24 in the cross-bar office thereby to effect the operation of a link circuit 25 to connect the trunk circuit 24 to an idle register-sender circuit 26 which includes signal receiver 27 arranged to respond to signals incoming over trunk 23 from the signal transmitter 18 of register-sender circuit 16 in the toll office.

The oscillator-modulator circuit 21 comprises a vacuum tube oscillator CO of known type tuned to generate carrier current of an audio frequency, for instance 1200 cycles per second and the modulator CM which is of the copper-oxide type, arranged to transmit double-sideband signal pulses. Reference may be had to Patent 2,025,158 granted to F. A. Cowan, December 24, 1935, for a detailed description of such a modulator. A low-pass filter 166 tuned to the timing pulse frequency, assumed to be 500 cycles per second, connects signal pulse conductor 150 to the mid-point of the left windings of transformer 167 of the modulator, the filter being effective to eliminate higher frequency components from the signal pulses. Normally the modulator CM is biased to render it nonconductive by the connection of negative biasing potential from potentiometer 148 through resistor 149, conductor 150, filter 166, left windings of transformer 167, copper-oxide rectifiers and right windings of transformer 168 to ground. Under this condition no carrier current is transmitted through the modulator to the output circuit. Each time the common output triode V19R is energized to transmit a signal pulse through conductor 150, the modulator CM is rendered effective to transmit carrier current from the oscillator through transformers 168 and 167, resistors 171 and 172, conductors 173 and 174, front contacts of relay 195, conductors 175 and 176, back contacts of relay 177 over the conductors of trunk 23 to the cross-bar office.

Since the signal transmitter circuit 18 is already operating to transmit signals when relay 195 connects the output of modulator CM to trunk 23, the signal receiver 27 of the register-sender 26 in the cross-bar office receives carrier current signal pulses as soon as it is connected to the incoming trunk circuit; and the signal transmitter continues to transmit the signal pulses until a stop dialing signal is received over trunk 23 from the cross-bar office. This signal consists of a pulse of current of 1800 cycles per second as hereinafter described and it is transmitted through conductors 175 and 176, conductors 173 and 174, the windings of directionally selective coil 170, condensers 178 and 179 and the left windings of transformer 180 to ground, and the signal voltage induced in the right winding of transformer 180 is applied to the grid of the left triode of vacuum tube 181. The tube 181 constitutes an amplifier, the right triode of which acts as a limiter in case the amplitude of the incoming signal is in excess of that required to effect signal response. The output circuit of the right triode includes a tuned circuit consisting of condenser 191 and coil 192 tuned to 1800 cycles per second so that the stop signal is applied to and rectified by the full-wave rectifier 193 and the rectified signal current effects the operative energization of the lower winding of polarized relay 194. The operation of relay 194 opens the locking circuit of relay 195; and the release of relay 195 disconnects the output conductors of modulator CM from conductors 175 and 176 to terminate the transmission of signals over the trunk. The register-sender circuit 16 is then restored to normal and relay 177 of trunk circuit 14 is operated to complete the talking connection between the calling line and trunk 23, in the manner described in the aforementioned Carpenter-Hersey patent.

It is to be noted that one register is provided for each item of information to be transmitted, and that the number of registers determines the number of stepper stages and gating tubes provided in the digit stepper circuit. It is also to be noted that the number of stepper stages provided in the coding stepper circuit depends on the character of the code employed in transmitting signals.

The incoming trunk circuit 24 to which the trunk 23 is connected in the cross-bar office is represented by relays 5801, 5802 and 5805 and the conductors leading to the sender link circuit 25 and the conductors connected to the incoming link. These relays correspond to the like designated relays in the aforementioned Carpenter patent, to which reference may be had for a complete description of the operation of the incoming trunk circuit 24, sender link circuit 25, marker circuit 34 and the operation of the incoming link and line link switches. The line relay 5802 of the incoming trunk circuit operates when the modulator CM in the toll office is connected by the aforementioned operation of relay 177 to the conductors of trunk 23. The operation of relay 5802 connects ground to conductor 203 causing the operation of a link circuit 25 to connect an idle register sender circuit 26 to the trunk circuit 24, and then to operate relay 204 in the stop dialing signal transmitter circuit 33. With the signal receiver circuit 27 normal, the operation of relay 204 closes a circuit including a back contact of relay 206, the winding of relay 210 and back contact of relay 215. Relay 210 operates thereby closing connections from the conductors of trunk 23, through conductors 201 and 202, front contacts of relay 210, and conductors 221 and 222 to the left winding of input transformer 223 in the volume control and detector circuit 28. In addition to the input transformer 223, the volume control and detector circuit 28 includes a push-pull amplifier stage comprising vacuum tubes 224 and 225, an output transformer 226, a full wave rectifier tube 229, a double triode vacuum tube 231, each triode operating as a cathode follower, and a feedback amplifier tube 237. The signals incoming over trunk 23 to the input transformer 223 are amplified by the push-pull pentode amplifier, and the output of the amplifier is transmitted through transformer 226 to the double diode full wave rectifier 229. The suppressor grids of the pentodes 224 and 225 are initially at ground potential, producing maximum amplification in these tubes. The detected signals which appear as a drop in potential across the output resistor 230 are applied to the grid of the left triode of tube 231 and in the anode-cathode circuit of this triode appear as a drop in potential across resistor 232. The signal output across resistor 232 is applied, through conductor 233 and condenser 234, to the grid of the right triode of tube 237, and is also applied through resistor 242 to the grid of the right triode of tube 231. The right triode of tube 237 is an amplifier, the grid of which is biased through resistor 236 and potentiometer 235, and the potentiometer is adjusted so that the negative bias applied to the grid establishes a threshold bias at which there is no current in the anode-cathode circuit; so that only the positive peaks of the signal pulses applied to conductor 233 which exceed this threshold bias are amplified. The negative voltage pulses thereby developed on the anode of the right triode of tube 237 are applied through condenser 238 to the cathode of the left triode, which acts as a rectifier; and the negative voltage pulses developed across resistor 239 and condenser 240 in parallel are applied through conductor 241 to the suppressor grids of amplifier tubes 224 and 225 to reduce the gain in these tubes until the level of the detected signal just balances the threshold bias applied to the grid of the right triode of tube 237. The resistor 243 and condenser 244 constitute a filtering network which removes some of the original carrier current ripple from the rectified and amplified signal pulses applied to the grid of the right triode of tube 231. This network also controls the recovery time of the gain of the amplifier when no signals are present. In response to each rectified and amplified signal pulse applied to the grid of the right triode of tube 231, a drop in potential is developed across resistor 242 and applied through signal conductor 245 to the decoding control circuit 29 shown in Fig. 7. The first wave form shown in Fig. 13 represents the signals on trunk 23 received by transformer 223 of the volume limiting and detector circuit 28; and the second wave form shown represents the detected constant level signal pulses applied through conductor 245 to the left grid of tube SL in the decoding control circuit.

The decoding control circuit 29 receives the detected signals from the volume control and detector circuit 28, reshapes these signals into a square wave form and then examines the resulting waves and recognizes the start signal pulse due to its six-position length, this being two pulse positions longer than any pulse occurring in two successive digit signals. Recognition of the start pulse is followed by recognition of the synchronizing signal pulse to start the generation of timing pulses at the same frequency (500 cycles per second) as that of the timing pulse oscillator in the transmitter circuit 18. The oscillator output is squared in wave form; positive timing pulses are developed to drive the sampling commutator circuit 30, one pulse in the middle of each digit code pulse position; digit gating pulses are developed and transmitted to the steering circuit 31; and at the same time the squared digit signal pulses are also transmitted to the steering circuit 31, all as hereinafter described in detail.

The decoding control circuit 29 comprises the double triode amplifier tube SL; a cathode-follower double triode tube SCF; a double triode tube STC responsive only to the first start signal pulse, a double triode tube STL which locks energized at the end of the start signal, a double triode tube SFF which responds to and locks energized at the end of the synchronizing signal pulse, a timing pulse oscillator circuit including the double triode OS, and a timing pulse squaring circuit which includes both triodes of the double triode tube SQ and the left triode of tube SSG. The right triode of tube SSG is used to transmit squared signal pulses from the right triode of tube SCF over conductor 289 to the digit steering circuit 31. The decoding control circuit further comprises a double triode tube C1, which counts one timing pulse from the left triode of tube SSG, and a double triode tube CPG, the left triode of which controls the transmission of driving pulses over conductor 296 to the steering circuit and the right triode of which controls the transmission of driving pulses over conductor 303 to the sampling commutator circuit 30.

The detected signal pulses transmitted through conductor 245 from the detector circuit 28 to the grid of the left triode of tube SL are amplified in each of the triodes of tube SL. The grid of this left triode of tube SL is biased to cut-off so that normally this triode is deenergized and only the signal voltage exceeding the normal bias is amplified therein and applied through condenser 247 to the right grid of tube SL. The right triode of tube SL is normally conducting so that only a small part of the signal voltage applied to its grid is amplified therein. Consequently, the two triodes of tube SL together amplify only a narrow slice of the signal wave received over conductor 245, and this amplified signal voltage slice is applied from the right anode of tube SL to the left grid of tube SCF. The signal voltage wave applied to the grid of the left triode of tube SCF is shown in line 3 of Fig. 13. Tube SCF acts as a cathode follower, the amplified signal voltage developed across resistor 248 and coil 249 in the output circuit of the left triode being applied to the anode of the right triode and also applied through conductor 250 and resistors 251 and 253 to the grid of the left triode of tube STC. The grid of the right triode of tube SCF is normally biased to be non-responsive to the application of positive voltage to the anode; so that the signal voltage output of the left triode is not further transmitted through the right triode until after a start signal has been transmitted through conductor 250 to tube SCF. The right triode of tube STC is normally energized, the drop in potential through resistor 257 constituting a bias which is sufficient to prevent energization of the left triode by signal pulses of as much as four pulse positions in length. Signals received prior to a start signal build up a charge on condenser 256 in the grid cathode circuit of the left triode of tube STC but this voltage is ineffective to cause the deenergization of this triode. During the interval between a signal pulse other than a start pulse and the next succeeding signal pulse applied to conductor 250 condenser 256 is discharged, the voltage across resistor 251 being dissipated through the rectifier 252. The discharge of condenser 256 is aided by the negative voltage generated across inductor 249 when the left triode of tube SCF is deenergized at the end of a signal pulse, the inductance being selected to prevent oscillations in the discharge circuit. When a start signal arrives, the charging of condenser 256 continues for six pulse positions whereby the normal grid bias is overcome at the end of the fifth pulse position; and the left triode of tube STC becomes energized, wherefor the grid of the right triode becomes sufficiently negative to effect the deenergization of the right triode.

The wave form of the integrated voltages applied to the grid of the left triode of tube STC is shown in line 4 of Fig. 13. When the right triode of tube STC is deenergized responsive to a start signal, a positive pulse is transmitted through condenser 260 and resistor 264 to the grid of the left triode of tube STL; but this triode is normally energized, so that this positive pulse is ineffective. When the start signal pulse terminates, the integrating network comprising condenser 256 is again discharged, the left triode of tube STC is deenergized and the right triode becomes energized. Resistor 253 is shunted by a condenser 254 to prevent the refiring of the left triode of tube STC for a predetermined short interval after recognition of a start signal. The reenergization of the right triode of tube STC effects the transmission of a negative pulse through condenser 260 to the left grid of tube STL thereby causing deenergization of the left triode and energization of the right triode of this tube. Since the right anode of tube STL is connected through resistor 261 to the left grid, the right triode is locked energized until a positive voltage is applied to conductor 219 as hereinafter described. When the left anode of tube STL becomes more positive due to deenergization of the left triode, the bias of the right grid of tube SCF is raised with respect to its cathode from below cut-off to a just cut-off value. In this condition, the cathode output voltage of the left triode of tube SCF is applied to the plate of the right triode and reproduced across resistor 270 in the anode-cathode circuit of the right triode; and the voltages developed across resistor 270 responsive to succeeding signals are applied through conductor 288 to the right grid of tube SSG to effect the transmission of signal pulses through conductor 289 to the steering circuit 31 to operate the digit registers as hereinafter described. When the next succeeding synchronizing signal pulse is received, three pulse positions after the end of the start signal, the voltage developed across the cathode resistor 270 in the anode-cathode circuit of the right triode of tube SCF is applied to conductor 288 and also through the gas-filled diode 271 to the left grid of tube SFF. The right triode of tube SFF is normally energized and the left triode is normally deenergized; and while the grid of the left triode is at a negative potential with respect to its cathode and with no voltage drop across resistor 270, the potential difference across the gas-filled diode 271 is insufficient to effect discharge therethrough. When the synchronizing signal is received, the voltage developed across resistor 270 is sufficient to cause diode 271 to become conducting, thereby changing the potential of the grid of the left triode of tube SFF to cause energization of this triode. When the left triode of tube SFF becomes energized, the left anode becomes less positive with respect to ground, and since this anode is connected through resistors 277 and 276 to the right grid, the normally energized right triode is deenergized. Deenergization of the right triode of tube SFF raises the potential of the right anode with respect to ground, thus reducing the voltage across diode 271 below the sustaining voltage. The deenergization of diode 271 prevents the negative voltage swing of the cathode of the right triode of tube SCF at the end of the synchronizing signal and each succeeding digit signal from affecting the energization of the left triode of tube SFF; so that this triode is locked energized until a positive pulse is applied to conductor 219 as hereinafter described.

Normally both triodes of tube OS are energized. The anode-cathode circuit of the left triode of tube OS includes gas-filled tube 280, potentiometer 282 and both windings of induction coil 284. The gas tube 280 is normally energized so as to apply a fixed negative voltage to the left cathode of tube OS. The values of the anode-cathode impedance and resistor 282 are such that normally the current through coil 284 is equal to the maximum when the oscillator network is oscillating; but this network comprising coil 284 and condenser 285 is normally damped to prevent oscillation. When the right triode of tube SFF is deenergized responsive to the synchronizing signal, the negative voltage pulse applied through resistor 277 to the right grid of tube SFF is also applied to the left grid of oscillator tube OS thereby causing the deenergization of the left triode. Upon deenergization of the left triode, the left anode of tube OS becomes more positive, and since the left anode is connected through resistor 282 to the right grid of tube OS, the right triode of tube OS starts to generate timing impulses at the frequency of 500 cycles per second, this being the same timing frequency as that employed in the signal transmitter 18. A variable resistor 283 in series with the right cathode of tube OS provides adjustment of the amplitude of the oscillator pulses; and variable resistor 282 provides for adjustment of the normal anode-cathode current of the left triode to a value which will cause oscillation to start immediately at steady state amplitude when the left triode is deenergized and to stop immediately with no decaying transient when the left triode is reenergized. The two triodes of tube SQ and the left triode of tube SSG constitute a three-stage squaring amplifier which amplifies the pulses generated in the oscillatory circuit of tube OS. The left triode of tube SQ, which constitutes the first stage, is normally energized to saturation; so that the first half cycle of voltage across the tuned circuit of the oscillator and all succeeding positive half cycles are eliminated. The wave form of the biasing timing pulses, and the square wave form of the pulses in the output of the second and third stages of the three-stage amplifier are illustrated in lines 5, 6 and 7 of Fig. 13. The anode of the left triode of tube SSG swings negative at the end of each complete cycle from the oscillator, the first negative swing corresponding in time to the end of the synchronizing signal and the start of the first digit signal code position. Each time the left anode of tube SSG swings negative, a negative voltage pulse is transmitted through condenser 286 to the left grid of tube C1 and also through condenser 297 to the right grid of tube CPG. The left triode of tube C1 is normally energized and the first negative pulse applied through condenser 286 to the left grid causes deenergization of the left triode, thereby raising the potential of the left anode and with it the right grid to cause energization of the right triode of tube C1. The right anode of tube C1 therefore becomes less positive and the potential of the left grid becomes sufficiently negative with respect to its cathode to prevent reenergization of the left triode until a positive voltage pulse is applied to conductor 219 as hereinafter described. The left anode of tube C1 is also connected through resistors 292 and 291 to the left grid of tube CPG and through resistor 298 to the right grid of tube CPG so that the deenergization of the left triode of tube C1 raises the potential of the right grid of tube CPG from considerably below the cut-off value to just below the cut-off value and raises the potential of the left grid of tube CPG from considerably below the cut-off value but not to a value just below the cut-off value. The charging of condenser 293 delays the raising of the potential of the left grid of tube CPG for approximately one-fourth of a timing pulse cycle.

From inspection of the wave forms in Fig. 13, lines 1 and 7, it is apparent that the anode of the left triode of tube SSG swings positive at the middle of each digit code pulse position; and each positive voltage pulse thereby transmitted through condenser 297 to the right grid of tube CPG subsequent to the deenergization of the left triode of tube C1 raises the grid potential above the cut-off value, causing the energization of the right triode of tube CPG. The voltage pulses developed across resistor 299 due to energization of the right triode of tube CPG are applied through conductor 303 to drive the sampling commutator circuit 30. As indicated by the wave form shown in line 6 of Fig. 13, the anode of the right triode of tube SQ swings positive at the end of each digit code pulse position; and positive voltage pulses are transmitted therefrom through condenser 290 to the left grid of tube CPG and raise the potential of this grid from the below cut-off level established when the left triode of tube C1 is deenergized to a value just below the cut-off value, thereby enabling the energization of the left triode of tube CPG each time a positive voltage pulse is received through conductor 305 from the sampling commutator circuit 30 as hereinafter described responsive to every fifth driving impulse transmitted from the right triode of tube CPG over conductor 303 to the sampling commutator circuit 30. Each time the left triode of tube CPG is energized, a voltage pulse is developed across resistor 295 and transmitted through conductor 296 to the digit steering circuit 31. The cyclic transmission of five stepping pulses to the sampling commutator circuit 30, one in the middle of each digit code pulse position and transmission of a stepping pulse through conductor 296 to the steering circuit 31 at the end of each digit code interval continues under control of timing pulses from the oscillator to effect the setting of each of the registers in the register and checking circuit 32 as hereinafter described. Referring to Fig. 13, line 8 shows the wave form of the driving pulses transmitted through conductor 303 to the sampling commutator circuit 30; and line 15 shows the wave form of the timing pulses applied through condenser 290 to the left grid of tube CPG.

The sampling commutator circuit 30 is a five-stage reentrant ring comprising five vacuum tubes SP0, SP1, SP2, SP4 and SP7, one for each digit code pulse position, similar to the five-stage ring in the code stepper of the signal transmitter 18 hereinbefore described. Each stage has its right cathode connected to the pulse input conductor 303. Normally the left triode of each of tubes SP0, SP1, SP2 and SP4 and the right triode of tube SP7 are energized and the other triodes are deenergized. The first positive pulse received through conductor 303 occurs in the middle of the first pulse position of the first digit code interval, causing the deenergization of the right triode of tube SP7, energization of the left triode of tube SP7, deenergization of the left triode of tube SP0, and energization of the right triode of tube SP0. Each succeeding stepping pulse received through conductor 303 steps the energization of the right triode from one stage to the next. Each stage has an output conductor 300, 301, 302, 304 or 307 extending from the left anode to the corresponding code position register device of each of the digit registers in the digit register and checking circuit 32; and a positive voltage pulse is applied to each of these conductors in the middle of one of the code pulse positions, one at a time in succession as illustrated in lines 9 to 13 of Fig. 13. The voltage pulses applied to conductor 307 are not only transmitted to the corresponding code position register device of each digit register but are also transmitted through conductor 305 to the grid of the left triode of tube CPG to cause the energization of this triode and transmission of a stepping pulse through conductor 296 to the rigit steering circuit 31. Since the right triode of tube SP7 is normally energized and the left triode normally deenergized, a positive voltage is being normally applied to conductor 305. The wave form of the voltage pulses transmitted through conductor 305 to the left grid of tube CPG is shown in line 14 of Fig. 13; and the wave form of the pulses applied to conductor 296 is shown in line 16. The positive potential supply for the left anode of each of tubes SP0, SP1, SP2 and SP4 and for the right anode of tube SP7 includes conductor 306 and is under the control of relay 216 shown in Fig. 5, the operation of relay 216 being effective to reset the signal receiver 27 at the end of a call as hereinafter described.

The digit steering circuit 31 comprises five double triode vacuum tubes A, B, C, D and CR forming a five-stage ring, non-reentrant but otherwise similar to the code stepper of the signal transmitter 18, and two double triode vacuum tubes 308 and 309 for gating the digit code pulses, one digit at a time. The tubes A, B, C and D control the four triodes of the gating tubes to steer the code pulses for each digit to the corresponding register of the register circuit 32. Tubes B, C and D further control the checking of the registration of the first three digits and tube CR controls the checking of the registration of the fourth digit in the register circuit 32. Normally the right triode of tube A and the left triode of each of tubes B, C, D and CR are energized and the other triodes of these tubes are deenergized. Conductor 296 to which positive stepping pulses are applied as hereinbefore described is connected to the right cathodes of each of tubes A, B, C and D, the first pulse causing the deenergization of the right triode and energization of the left triode of tube A followed by deenergization of the left triode and energization of the right triode of tube B. In like manner each of the next three pulses applied to conductor 296 advances the energization of the triodes of tubes B, C, D and CR so that the fourth pulse shown in line 16 of Fig. 13 effects deenergization of the left triode and energization of the right triode of tube CR. The advance from energization of the right triode of tube CR to energization of the right triode of tube A is effected by operation of relay 216 as hereinafter described, a back contact of this relay being included in the connection from the 150-volt positive voltage source and the anode of the right triode of tube A and the anodes of the left triodes of tubes B, C, D and CR.

With the left triode of tube A normally deenergized, the left anode is at maximum positive potential with respect to ground and so also is the grid of the left triode of the tube 308 opening the gate therethrough for signal pulses applied to conductor 289 prior to and during the first cycle of operation of the sampling commutator circuit 30. Thus the synchronizing signal pulse and the coded pulses for the first digit 5 applied in the second and fourth pulse positions to conductor 289 energize the left triode of tube 308 and develop a voltage across resistor 311 thereby transmitting corresponding positive voltage pulses through conductor SA to the grids of the gas-filled tubes A0, A1, A2, A4 and A7 in the register circuit to effect registration of the digit 5 in the manner hereinafter described. The synchronizing pulse is without effect since this pulse is applied to conductor 289 prior to the transmission of timing pulses to the sampling commutator and transmission of pulses to the register circuit 32 over any one of conductors 300, 301, 302, 304 and 307. When the left triode of tube B is deenergized, its left anode attains maximum positive potential with respect to ground so that a positive voltage is applied to register checking conductor 315 and also to the grid of the right triode of tube 308 to open the gate therethrough for signal pulses applied to conductor 289 during the second cycle of operation of the sampling commutator circuit 30. Thus the coded pulses applied to conductor 289 in the first and fifth pulse positions for the second digit 7 effect energization of the right triode of gating tube 308 and develop a voltage across resistor 312 which is transmitted through conductor SB to the grids of the gas-filled tubes B0, B1, B2, B4 and B7 in the register circuit 32. When the left triode of tube C is deenergized, the left anode attains maximum positive potential with respect to ground so that a positive voltage is applied to register checking conductor 316 and also to the grid of the left triode of tube 309 to open the gate therethrough for signal pulses applied to conductor 289 during the third cycle of operation of the sampling commutator circuit. Thus the coded pulses applied to conductor 289 in the second and third pulse positions for the third digit 3 effect energization of the left triode of gating tube 309 and develop a voltage across resistor 313 which is transmitted through conductor SC to the grids of the gas-filled tubes C0, C1, C2, C4 and C7 in the register circuit. When the left triode of tube C is deenergized, the left anode attains maximum positive potential with respect to ground so that a positive voltage is applied to register checking conductor 317 and also to the grid of the right triode of tube 309 to open the gate therethrough for signal pulses applied to conductor 289 during the fourth cycle of operation of the sampling commutator circuit 30. Thus the coded pulses applied to conductor 289 in the first and second pulse positions for the fourth digit 1 effect energization of the right triode of gating tube 309 and develop a voltage across register 314 which is transmitted through conductor SD to the grids of the gas-filled tubes D0, D1, D2, D4 and D7 in the register circuit. When the left triode of tube CR is deenergized, the left anode attains maximum positive potential which is thereby applied to register checking conductor 318. The wave forms of the gating pulses and signal pulses transmitted through each gate of the steering circuit are shown in lines 17 to 24 of Fig. 13.

Figure 9:
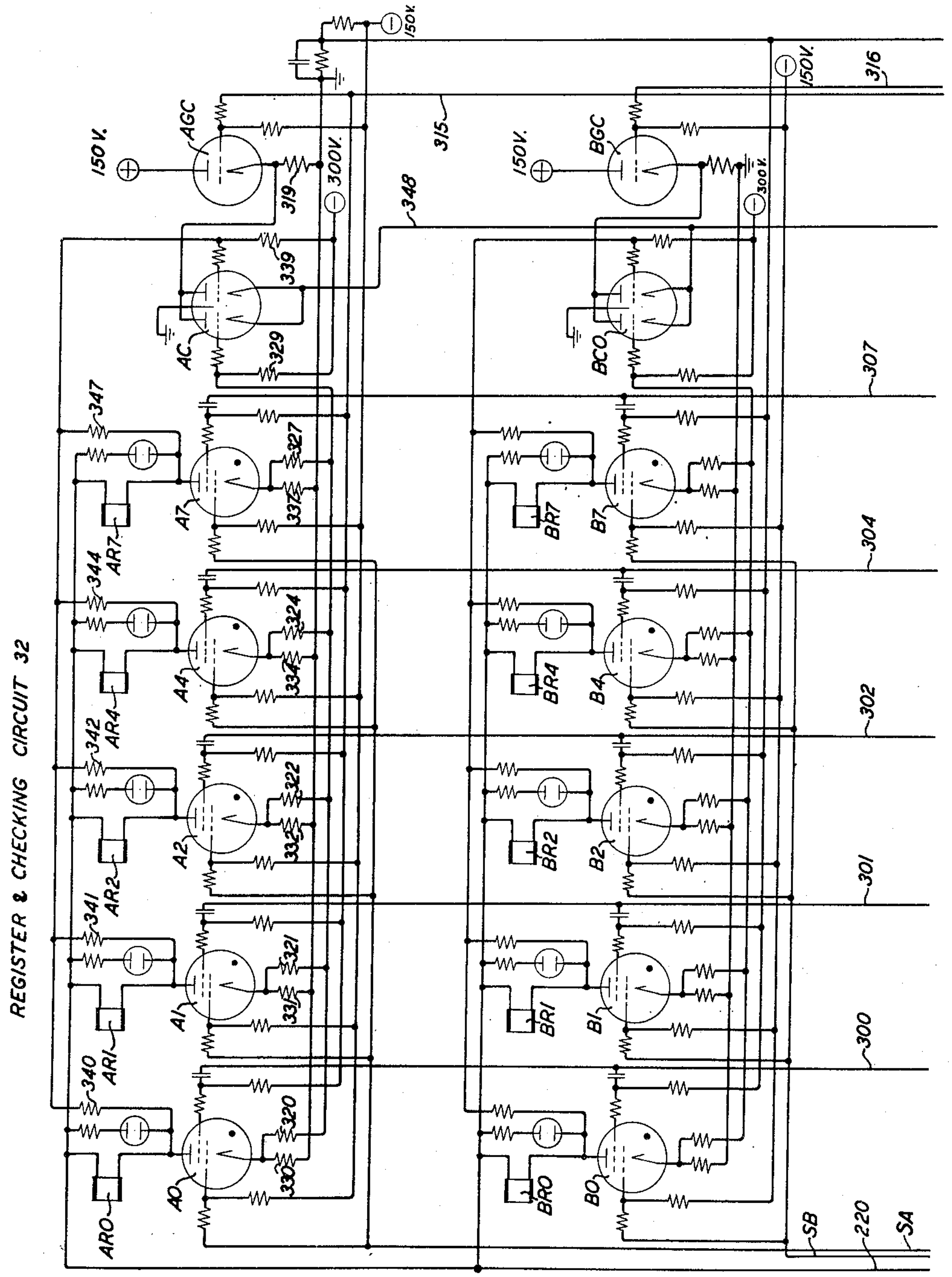
Figure 10:
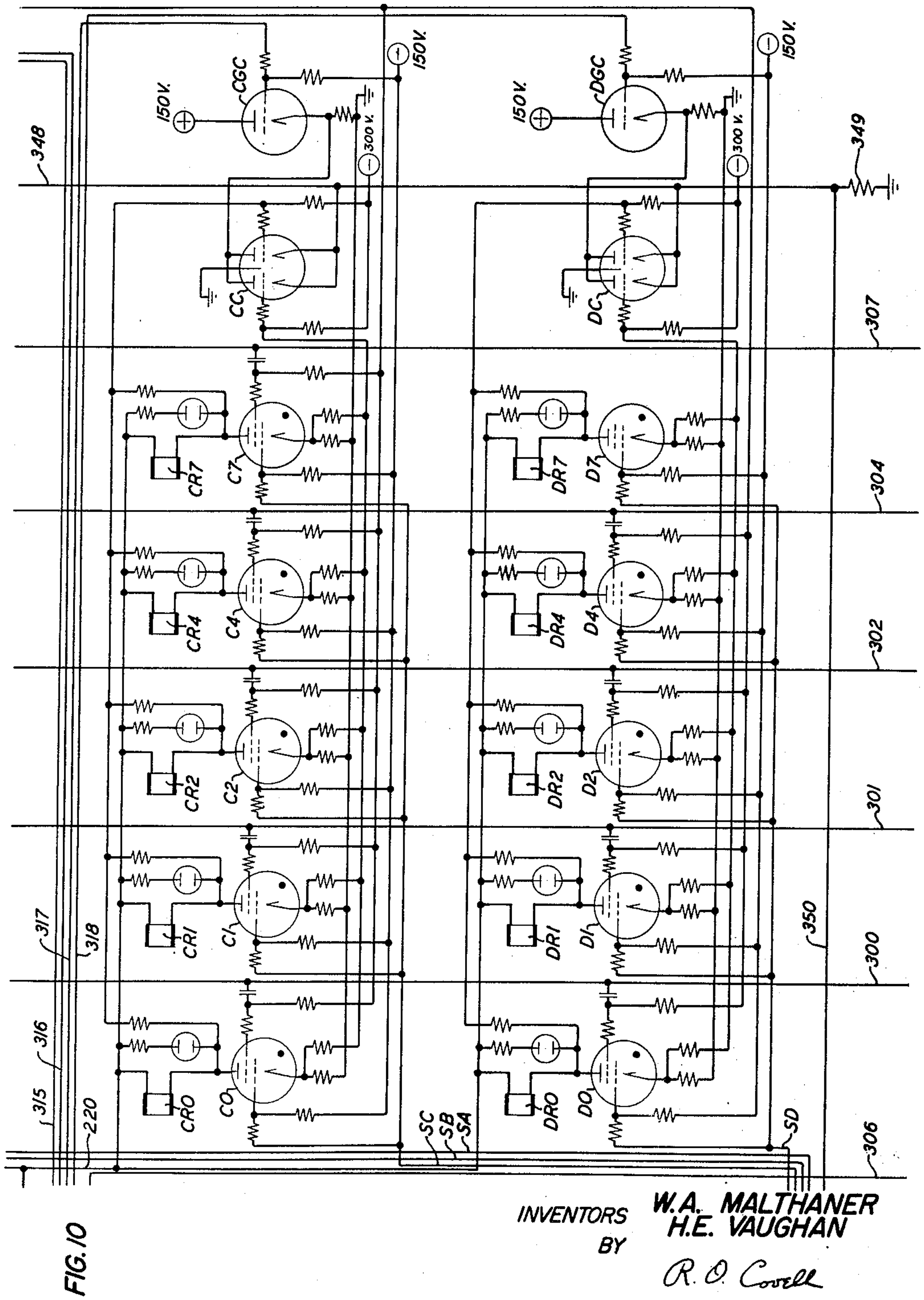
Figure 11:
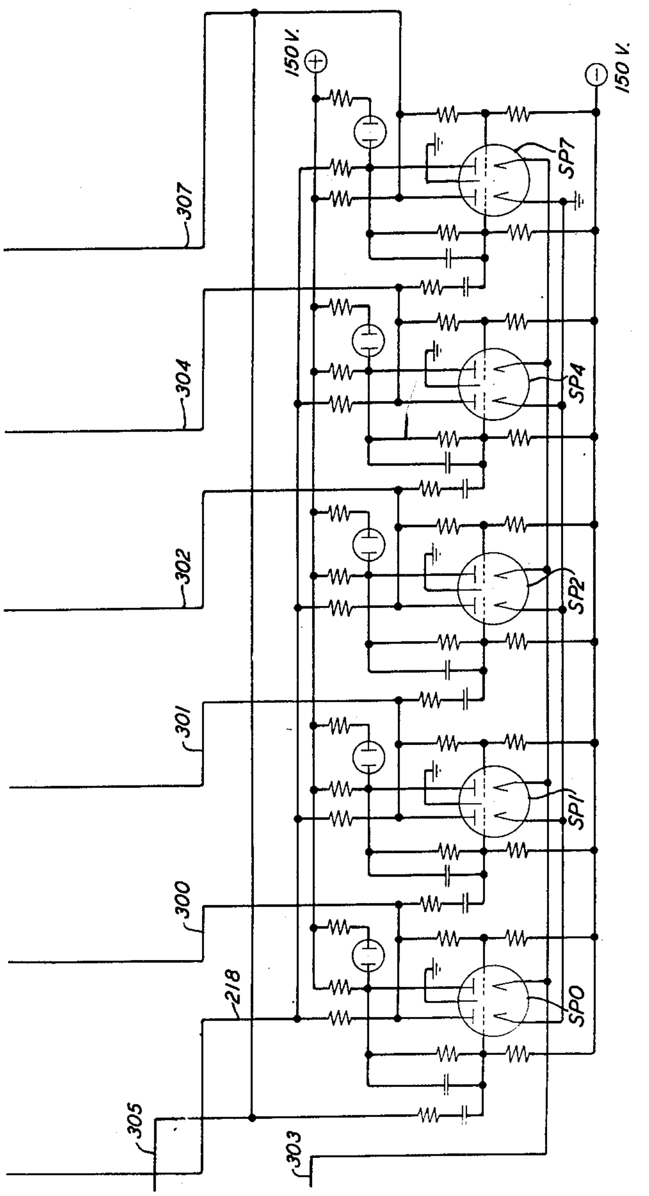

Each of the four digit registers of the register and checking circuit 32 shown in Figs. 9 and 10 comprises five gas-filled tubes for operation responsive to the coded signal pulses, five register relays controlled by the gas-filled tubes and two double triode vacuum tubes for checking the operation of the associated gas-filled tubes. Thus the register for the first digit comprises gas-filled tubes A0, A1, A2, A4 and A7, register relays AR0, AR1, AR2, AR4 and AR7 and vacuum tubes AC and AGC. The corresponding tubes and relays of each of the other three registers are similarly identified except that the prefix A is replaced by B, C or D. While the left triode of tube SP0 in the sampling commutator circuit 30 is deenergized during the first cycle of operation of the commutator circuit, the positive voltage applied to conductor 300 raises the potential of the negatively biased screen grids of gas-filled tubes A0, B0, C0 and D0; so that, if at that time a digit code pulse was applied to conductor SA in the steering circuit, tube A0 would be energized but tubes B0, C0 and D0 would not be energized. While the left triode of tube SP1 in the commutator circuit 30 is deenergized during the first cycle of operation, the positive voltage applied to conductor 301 raises the potential of the negatively biased screen grid of gas-filled tubes A1, B1, C1 and D1; so that, if at that time a digit code pulse was applied to conductor SA, tube A1 would be energized but tubes B1, C1 and D1 would not be energized. While the left triode of tube SP2 in the commutator circuit 30 is deenergized during the first cycle of operation, the positive voltage applied to conductor 302 raises the potential of the negatively biased screen grid of gas-filled tubes A2, B2, C2 and D2; so that, if at that time a digit code pulse was applied to conductor SA, the tube A2 would be energized but tubes B2, C2 and D2 would not be energized. While the left triode of tube SP3 in the commutator circuit 30 is deenergized during the first cycle of operation, the positive voltage applied to conductor 304 raises the potential of the negatively biased screen grid of gas-filled tubes A4, B4, C4 and D4; so that, if at that time a digit code pulse was applied to conductor SA, the tube A4 would be energized but tubes B4, C4 and D4 would not be energized. Thus if 5 is the first digit, tubes A1 and A4 of the first register would be energized. In like manner, during the second cycle of operation of commutator circuit 30, the positive voltage applied through each of conductors 300 to 307 in succession to the screen grids of the gas-filled tubes enables the energization of four tubes at a time, one in each register, as on the first cycle of operation; and the two tubes of the second register, to the grids of which a signal pulse is applied through conductor SB from the steering circuit while positive voltage is applied to the screen grid, are energized to effect registration of the second digit. For the digit value 7, tubes B0 and B7 would be energized. During the third cycle of operation of commutator circuit 30, the positive voltage applied through each of conductors 300 to 307 in succession to the screen grids of the gas-filled tubes enables the energization of four tubes at a time, one in each register, as on the first cycle of operation; and the two tubes of the third register, to the grids of which a signal pulse is applied through conductor SC from the steering circuit while positive voltage is applied to the screen grid, are energized to effect registration of the third digit. For the digit value 3, tubes C1 and C2 would be energized. During the fourth cycle of operation of commutator circuit 30, the positive voltage applied through each of conductors 300 to 307 in succession to the screen grids of the gas-filled tubes enables the energization of four tubes at a time, one in each register, as on the first cycle of operation; and the two tubes of the fourth register, to the grids of which a signal pulse is applied through coductor SD from the steering circuit while positive voltage is applied to the screen grid, are energized to effect registration of the fourth digit. For the digit value 1, tubes D0 and D1 would be energized.

The registration of each digit is checked to determine whether two and only two of the gas-filled tubes are energized, the tubes AGC, BGC, CGC and DGC being energized in succession by the application of positive voltage to conductors 315, 316, 317 and 318 by operation of the steering circuit as hereinbefore described. The checking of the setting of the first register will be described in detail. The application of a positive voltage to conductor 315, as hereinbefore described, effects energization of the tube AGC, thereby supplying positive anode potential for tube AC. Normally with each of gas-filled tubes A0 and A7 deenergized, the bias applied to the left grid of tube AC is determined by a potentiometer network comprising resistor 329 in series with both cathode resistors (320 and 330, 321 and 331, etc.) of each gas-filled tube; and the left triode of tube AC is thereby biased beyond cut-off. When any gas-filled tube becomes energized, the voltage developed across resistor 329 is increased; and, if more than two of the gas-filled tubes are energized, the increase in voltage across resistor 329 raises the grid potential sufficiently to cause energization of the left triode of tube AC. Similarly with each of gas-filled tubes A0 to A7 deenergized, the potential of the grid of the right triode of tube AC is determined by a potentiometer network comprising resistor 339 in series with the anode resistor and register relay (340 and AR0, 341 and AR1, etc.) of each gas-filled tube; and the right triode of tube AC is normally energized. When any gas-filled tube is energized, the potential of the right grid of tube AC is lowered; and if two or more gas-filled tubes are energized the right triode of tube AC is deenergized. It is apparent therefore that if two and only two of gas-filled tubes A0 to A7 are energized, both triodes of tube AC are deenergized and there is therefore no voltage developed across resistor 349. But if less than two of the gas-filled tubes are energized, the right triode of tube AC remains energized; and if more than two of the gas-filled tubes are energized, the left triode of tube AC is energized; and, in either case, a voltage is developed across resistor 349. In the same manner, the second, third and fourth registers are checked; and since resistor 349 is common to all of the registers, a voltage is developed thereacross if, in any register, less than two or more than two of the gas-filled tubes are energized. The voltage developed across resistor 349 in case any register is incorrectly operated, is applied through conductor 350 to the grid of tube RT in Fig. 5, thereby causing energization of relays 215 and 216 in the anode-cathode circuit of this tube. The operation of relay 215 causes the release of relay 210 and thereby disconnects the input transformer of the detector circuit 28 from the trunk circuit 24 and disconnects the positive voltage source from the windings of the register relays to cause release of any operated relay and deenergization of the associated gas-filled tube. The operation of relay 216 inserts induction coil 217 in series with conductor 218 thereby causing transmission of a negative voltage pulse through this conductor to cause the deenergization of the right triode of tube CR and deenergization of the left triode of each of tubes B, C and D in the digit steering circuit 31 and deenergization of the left triode of each of tubes SP0 to SP4 and the right triode of tube SP7 in the sampling commutator circuit 30. The operation of relay 216 also connects positive voltage through conductor 219 and rectifier 265 to the left grid of tube STL in the detector circuit 29 to effect the resetting of tube STL with its left triode energized and its right triode deenergized. The connection of positive voltage to conductor 219 also effects breakdown of diode 275 in the detector circuit 29 thereby to effect energization of the right triode and deenergization of the left triode of tube SFF and to effect energization of the left triode and deenergization of the right triode of tube OS, thereby to stop the generation of timing pulses. The connection of positive voltage to conductor 219 further causes breakdown of diode 287, thereby effecting energization of the left triode and deenergization of the right triode of tube C1 in the detector circuit 29. With all of the gas-filled tubes in the register circuit 32 deenergized and with the right triode of each of tubes B, C, D and CR in the digit-stepping circuit deenergized, the checking tubes of each register are deenergized and conductor 350 assumes ground potential; and the grid of tube RT becomes negative, whereby tube RT is deenergized and relays 215 and 216 release. The release of relay 215 causes the reoperation of relay 210 and the release of relay 216 short-circuits coil 217 thereby transmitting a positive voltage pulse through conductor 218 to reestablish the normal condition of tubes A, B, C, D and CR in the steering circuit 31 and the normal condition of the tubes in the sampling commutator circuit 30. The reoperation of relay 210 reconnects the detector circuit 28 to the trunk circuit 24 and the hereinbefore described operation of the signal receiver 27 is repeated.

Figure 5:
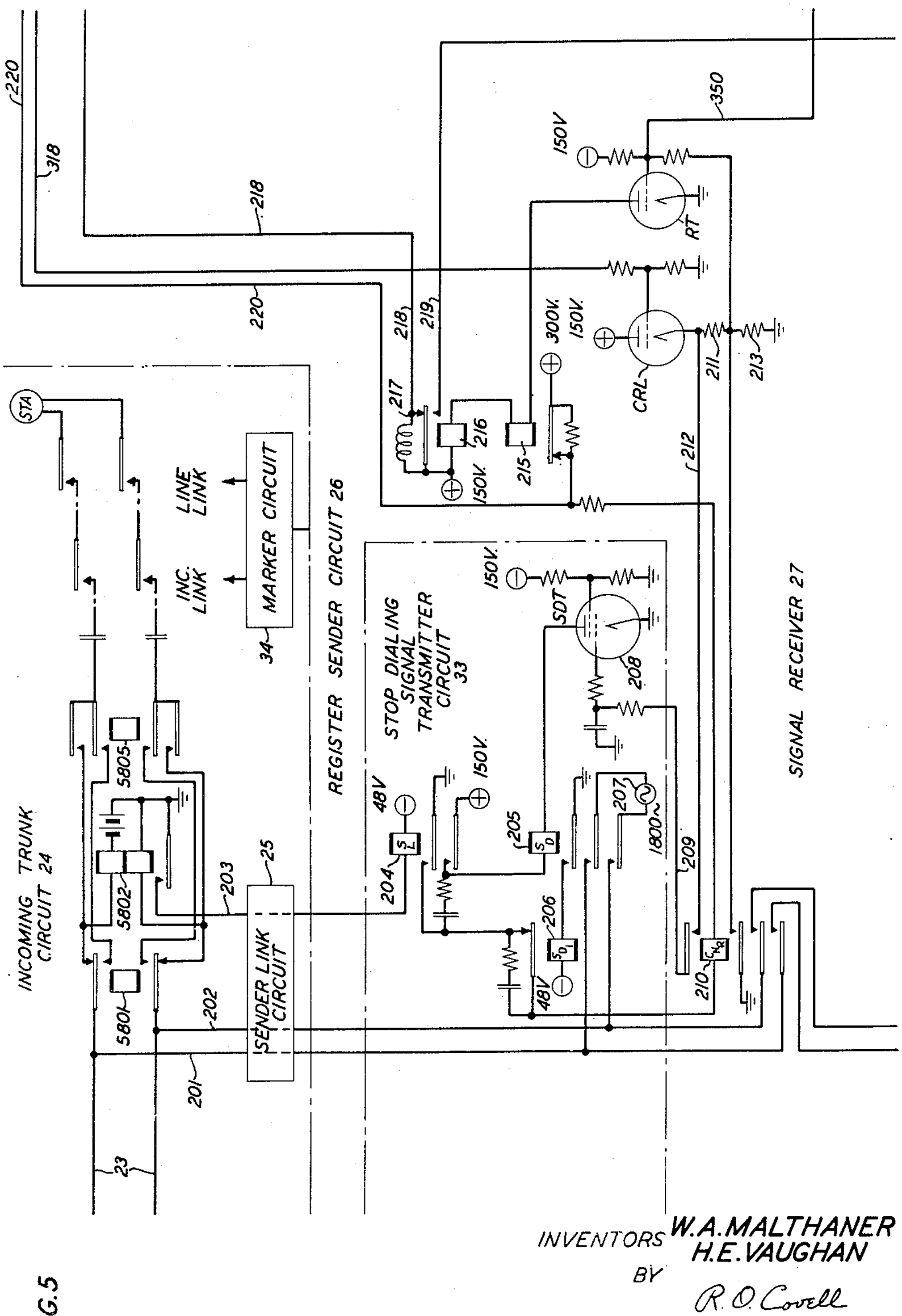
Figure 6:
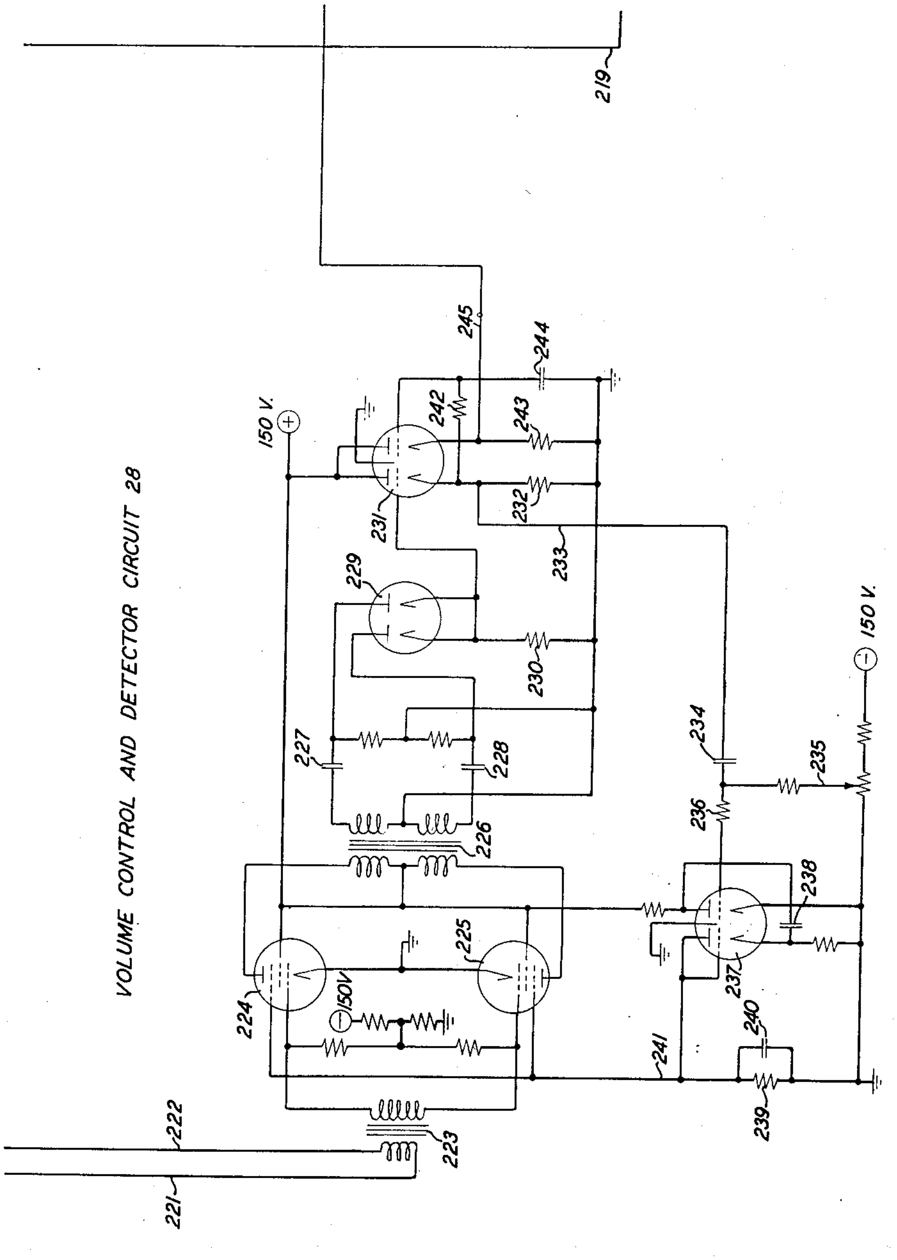

If, at the time the right triode of tube CR in the digit steering circuit is energized after setting of the fourth register, no reset voltage pulse has been transmitted over conductor 350 to the grid of tube RT, the positive voltage pulse applied to conductor 318, when the left triode of tube CR is extinguished, raises the potential of the grid of tube CRL in Fig. 5, thereby effecting energization of tube CRL. A positive voltage is thereby applied through conductor 212 and a front contact of relay 210 to the grid of tube SDT, causing energization of this tube and operation of relay 205. The operation of relay 205 causes operation of relay 206; and the operation of relay 206 causes release of relay 210. The operation of relay 205 also connects tone source 207 across conductors 201 and 202 thereby transmitting a stop signal over trunk 23 to the stop signal detector and control circuit 22. When relay 210 releases, the signal receiver is disconnected from trunk circuit 24 and the short circuit across resistor 213 is opened whereby the grid of tube RT swings positive to effect energization of tube RT and operation of relays 215 and 216 to effect reset of the signal receiver to normal as above described. When the right triode of tube CR in the steering circuit 31 is deenergized, tube CRL is deenergized, tubes RT and SDT are deenergized, and relays 205 and 206 release. The release of relay 205 terminates the transmission of stop signal tone over trunk 23.

The operation of the register relays having been completed, a marker circuit 34 is effective to control completion of the desired connection, and the link circuit 25 is released to disconnect the register sender circuit 26 from the trunk circuit 24 as described in the aforementioned Carpenter patent.

Referring now to the alternative decoding control circuit shown in Fig. 14, the signal pulses received through conductor 245 from the volume control and detector circuit 28 are applied to the grid of the left triode of tube SL*a* which constitutes a two-stage amplifier which amplifies a narrow section of the signal to reproduce signals in a square wave train form. The squared signals are applied through resistor 414 to the grid of the right triode of tube OSG which grid is normally biased to a value just below cut-off by a voltage supplied through resistor 416 from the anode of the right triode of tube SFF*a*, the right triode of tube SFF*a* being normally energized. With the right triode of tube OSG normally deenergized, the left triode of tube OS*a* is normally energized, thereby damping the particular one of the tuned parallel resonant networks 355, 356 and 357, which is connected in the grid-cathode circuit of the right triode of tube OS*a* by switch wipers 352 and 353, so as to prevent oscillation. The provision of three differently tuned networks permits the use of the decoding control circuit 29*a* for receiving signals at any desired one of three different basic signaling frequencies. The switch wipers 351, 352 and 353 are mounted on a single shaft and are positioned simultaneously in any desired one of three positions. In the further description herein, it is assumed that these wipers are in the position shown in the drawing. Each signal pulse applied to the grid of the right triode of tube OSG raises the grid potential to effect energization of this triode; whereby the potential of the anode of this triode is lowered to effect deenergization of the left triode of tube OS*a* and thus start oscillation in network 355 and the right triode of tube OS*a*. The variable resistor 358 is used to adjust the amplitude of the oscillations in the anode-cathode circuit of the right triode; and the variable resistor 354 is used to adjust the anode-cathode current of the left triode to a value which stops oscillation in the anode-cathode circuit of the right triode when both triodes of tube OS*a* are energized and yet permits oscillation to start immediately at steady state amplitude with no decaying transient when the left triode of tube OS*a* is deenergized. The oscillation output of tube OS*a* is applied through resistor 359 to the left grid of tube SQ*a* and is amplified in each triode of tube SQ*a* to produce a square wave of the basic timing frequency. Normally the first stage of this squaring amplifier is at saturation so that the first half cycle of voltage across the tuned network 355, this being a positive half cycle, and all succeeding positive half cycles are eliminated by grid clipping; so that only a narrow slice of the negative half cycles of the oscillator waves are used to produce square timing pulses.

The plate of the right triode of tube SQ*a* swings positive at the end of each code pulse position, and a positive voltage is thereby applied to the left plate of the gas-filled diode 368. The right plate of diode 368 is connected to the left grid of tube SCG, which is normally biased to just below the cut-off value by reason of its connection through resistor 370 to a source of −150 volts and through resistor 369, conductor 483 and resistor 485 to a source of +300 volts, the right triode of tube STL*a* being normally deenergized. Thus the voltage across the plates of the diode 368 is raised to the discharge value when the right anode of tube SQ*a* swings positive at the end of each code pulse position while the oscillator is generating timing pulses, thereby raising the potential of the grid of the left triode of tube SCG to effect energization of this triode. Upon energization of the left triode of tube SCG, the anode swings negative, the wave form of the anode voltage being a square wave and inverted with respect to the square wave voltage at the right anode of tube SQ*a*. At the middle of each code pulse position, the diode 368 becomes deenergized and so also does the left triode of tube SCG. The square wave voltage of the left anode of tube SCG is transmitted through conductor 371, differentiating condenser 440 and common grid resistor 449 of tube CS1, the voltage across resistor 449 being applied to both grids of tube CS1. The tube CS1 is the first stage of a three-stage binary counter, which is driven by the negative voltage pulses applied to condenser 440 during the time the right triode of tube OSG is energized responsive to a signal pulse incoming over conductor 245 from the detector circuit 28. Normally the left triode of each of the counter tubes CS1, CS2 and CS4 is energized and the right triode of each tube is deenergized. The counter stages are operated, as hereinafter described, to count the timing pulses applied to conductor 371 while a signal pulse is being received over conductor 245 and thereby measure each signal pulse to determine whether it continues long enough to be a start pulse. At the end of a signal pulse received over conductor 245, the right anode of tube SL*a* swings negative whereby the right triode of tube OSG is deenergized and the left triode of tube OS*a* is reenergized, thereby stopping oscillations in the right triode of tube OS*a* and the transmission of negative voltage pulses from the left anode of tube SCG through conductor 371 and condenser 440 to the grids of tube CS1. The aforementioned negative voltage swing of the anode of the right triode of tube SL*a*, at the end of each signal pulse, is also applied through a differentiating condenser 500 to the grids of counter reset tube CR*a*. Tube CR*a* is connected like a voltage regulator to normally supply a positive voltage to the anode of the normally energized, left triode of each of the three counter tubes CS1, CS2 and CS4. When a negative voltage pulse is applied through condenser 500 to the grid of tube CR*a*, a corresponding voltage pulse is applied to the left anode of each of the counter tubes, thereby resetting these tubes to normal with the left triode of each tube energized and the right triode of each tube deenergized.

The oscillator OS*a* is started and timing impulses are transmitted from the left anode of tube SCG through conductor 371 and condenser 440 to the grids of counter tube CS1 responsive to each signal pulse received by tube SL*a* over conductor 245 prior to a six-position start signal pulse and likewise in response to the first start signal pulse received over conductor 245. The first negative voltage timing pulse transmitted from the left anode of tube SCG, through conductor 371, condenser 440 and grid resistor 449, produces a short negative pulse across resistor 449 which causes deenergization of the normally energized left triode of tube CS1. A positive voltage pulse is thereby transmitted from the left anode to the right grid of tube CS1; but, as long as the negative timing pulse through resistor 449 persists, the right triode remains deenergized. When the timing pulse ends, the left grid of tube CS1 is at a lower potential than the right grid because the charge stored in the small capacity by-pass condenser 445 while the left triode was conducting exceeds the charge on the small capacity by-pass condenser 446; so that the right triode becomes energized and the left triode remains deenergized.

The next negative timing pulse transmitted through condenser 440 and grid resistor 449, produces a short negative pulse across the resistor which effects deenergization of the right triode of tube CS1; and, at the end of this impulse, the left triode is energized and the right triode remains deenergized for similar reasons to those above described with respect to energization of the right triode at the end of the first timing pulse. When the left triode of tube CS1 is energized at the end of the second timing pulse through resistor 449, a negative pulse is transmitted through condenser 450 and the common grid resistor 459 of tube CS2, whereby the left triode of tube CS2 is deenergized; and, at the end of the driving pulse developed across resistor 459, the right triode of tube CS2 is energized and the left triode remains deenergized for similar reasons to those above described with respect to tube CS1. The third negative timing pulse transmitted through conductor 371, condenser 440 and resistor 449 effects the deenergization of the left triode of tube CS1 and at the end of the pulse through resistor 449 the right triode of tube CS1 is reenergized in the manner described with respect to the first timing pulse. No change occurs in tube CS2 so that at the end of the third timing pulse the right triodes of both tubes CS1 and CS2 are energized. The fourth negative timing pulse transmitted through conductor 371, condenser 440 and grid resistor 449 effects the deenergization of the right triode of tube CS1; and, at the end of this pulse, the left triode of tube CS1 is reenergized. A negative pulse is thereby transmitted from the left anode of tube CS1 through condenser 450 and grid resistor 459, causing the deenergization of the right triode of tube CS2. At the end of the pulse through resistor 459, the left triode of tube CS2 is reenergized, thereby causing the transmission of a negative pulse from the left anode of tube CS2 through condenser 460 and grid resistor 469, causing the deenergization of the left triode of tube CS4. At the end of the pulse through resistor 469, the right triode of tube CS4 is energized. The fifth negative timing pulse transmitted through condenser 440 and resistor 449 effects the deenergization of the left triode of tube CS1; and, at the end of the pulse through resistor 449, the right triode of tube CS1 is reenergized. Thus tubes CS1, CS2 and CS4 count the timing pulses and indicate the number of code positions during which the same signal pulse is being received over conductor 245. If the end of the signal pulse occurs before five code positions have been counted, the counter tubes are reset as above described with the left triodes energized and the right triodes deenergized.

When a six-position start signal is received over conductor 245, the counter tubes will count five timing pulses. With the left triode of tube CS4 deenergized responsive to the fourth timing pulse, the left anode becomes more positive thereby decreasing the negative bias of the left grid of tube CFF to a value just below the cut-off value, this grid being normally biased to a point considerably below the cut-off value. The right triode of tube CFF is normally energized. When the left triode of tube CS1 becomes deenergized responsive to the fifth timing pulse, a positive pulse is transmitted from the left anode of tube CS1 through condenser 470 to the left grid of tube CFF thereby overcoming the just below cut-off bias to effect energization of the left triode. The left anode of tube CFF thereupon becomes less positive and as also does the right grid, whereby the normally energized right triode of tube CFF is deenergized. At the end of the start signal, the negative voltage applied through condenser 500 to the grids of tube CR*a* causes the resetting of the counter tubes, as above described, and also causes the deenergization of the left triode of tube CFF followed by the reenergization of the right triode of tube CFF. The deenergization of the left triode of tube CFF effects the transmission of a positive pulse through condenser 482 to the right grid of tube STL*a*, whereupon the right triode of tube STL*a* becomes energized; and a negative pulse is thereby transmitted from the right anode of tube STL*a* to the left grid, to effect the deenergization of the normally energized left triode of tube STL*a*. The energization of the right triode of tube STL*a* constitutes recognition of the receipt of a start signal over conductor 245. With the right triode of tube STL*a* energized, the right anode becomes less positive thereby increasing the negative bias of the left grid of tube SCG to prevent subsequent transmission of timing pulses through conductor 371 to the counter tubes. The increase in the positive potential of the left anode of tube STL*a* changes the negative bias on the left grid of tube SSG*a* from below cut-off bias to full conduction bias; but there is no current in the anode-cathode circuit of the left triode until a synchronizing signal pulse is received over conductor 245. Condenser 493 prevents a transient in the left grid-cathode circuit of tube SSG*a* when the bias of the left grid is raised to the full conduction value. Varistor 505 limits positive transients on the cathode of tube CR*a*.

When the synchronizing signal pulse is received over conductor 245 following the six-position start signal, the oscillator OS*a* is again started. The left triode of tube OSG acts as a cathode follower whereby an increased current through cathode resistor 413 raises the positive voltage applied to the left anode of tube SSG*a*. Prior to the above-described change in the bias of the left grid of tube SSG*a* due to energization of the right triode of tube STL*a* following receipt of the start signal, the left triode of tube SSG*a* remained non-conducting when the anode potential was raised responsive to incoming signals. But when the synchronizing signal is received following energization of the right triode of tube STL*a*, the raising of the potential of the left anode of tube SSG*a* effects the energization of the left triode of tube SSG*a* and consequently an increase in the potential drop across cathode resistor 498 which is applied through resistor 499 to the right grid of tube SSG*a*; whereby a slice of the synchronizing signal is transmitted through the right triode of tube SSG*a* and through conductor 289 to the steering circuit 31. Each succeeding signal pulse is likewise amplified and transmitted through conductor 289 to the steering circuit 31 and thence to the register circuit 32 as hereinbefore described.

The aforementioned increase in positive voltage applied through resistor 499 to the right grid of tube SSG*a*, upon receipt of the synchronizing signal, is also applied to the gas-filled tube 430, effecting breakdown of the tube 430 and application of the signal pulse to the left grid of tube SFF*a*. Normally the right triode of tube SFF*a* is energized and the left triode deenergized. When gas-filled tube 430 breaks down, the left triode of tube SFF*a* becomes energized and the right triode is thereupon deenergized. The resulting increase in the positive voltage at the right anode of tube SFF*a* is effective to maintain the right grid of tube OSG at a sufficiently positive potential to continue its energization while digit signal pulses are being received; and the continued energization of the right triode of tube OSG*a* causes the oscillator tube OS*a* to continue to generate the basic timing wave. The raising of the potential of the left grid of tube SFF*a*, when the right triode is deenergized, decreases the voltage across gas-filled tube 430 and this tube is extinguished; so that the reduction in voltage across cathode resistor 498 at the end of the synchronizing signal and at the end of each of the succeeding signals does not affect the energization of the left triode of tube SFF*a*.

In addition to maintaining the oscillator OS*a* in a free running condition, the positive voltage change of the right anode of tube SFF*a* raises the direct bias applied through resistor 374 to the right grid of tube SCG from a value considerably below cut-off to just below the cut-off value. The right grid of tube SCG is also connected through gas-filled tube 375 and condenser 376 to the right anode of the timing frequency squaring tube SQ*a*, so that the positive change in the potential of the right anode of tube SQ*a* one code position after the start of the incoming synchronizing signal causes breakdown of tube 375 and thereby produces a squared negative voltage pulse on the right anode of tube SCG. It is to be noted that although this positive change in the potential of the right anode of tube SQ*a* is also applied to gas-filled tube 368, the left triode of tube SCG remains deenergized because of the increased negative bias applied through conductor 483 and resistor 369 to the left grid of tube SCG resulting from the above-described energization of the right triode of tube STL*a*. The use of gas-filled tubes 368 and 375 to couple the oscillator voltage to the grids of tube SCG aids the gating action, produces further squaring of the oscillator wave for better differentiation, permits placing the high impedance differentiating condensers at the desired points, and eliminates difficulties which would arise because of double differentiation if the diodes were replaced by small condensers. Varistors might be used in place of the gas-filled diodes if signal speeds in excess of the deionization capabilities of the diodes were necessary.

The negative change in voltage at the right anode of tube SCG is transmitted through differentiating condenser 380 to the left grid of the count one tube C1*a*, thereby causing deenergization of the normally energized left triode of tube C1*a*. The resulting positive change in the voltage on the left anode of tube C1*a* is applied through resistor 387 to the right grid of tube C1*a* causing energization of the right triode of tube C1*a*; is applied through resistor 396 to the right grid of tube CPG*a*, whereby the potential of this grid is raised from considerably below cut-off to just below cut-off; and is applied through resistors 388 and 392 to the left grid of tube CPG*a*, whereby the potential of this grid is raised from considerably below the cut-off value but not up to a value just below cut-off. The positive change in potential of the left grid of tube CPG*a* is delayed for a fraction of a code pulse interval by connection of a condenser 394 in parallel with resistor 393 from the junction of resistors 388 and 392 to −150 volts.

The anode of the left triode of tube SQ*a* becomes more positive at the middle of each signal code pulse position and, since the left anode of tube SQ*a* is connected through differentiating condenser 397 to the right grid of tube CPG*a*, positive voltage pulses are applied to conductor 303 at the center of each signal code pulse position as indicated in line 8 of Fig. 13 after tube CPG*a* has been primed by the deenergization of the left triode of tube C1*a*. These positive voltage pulses drive the sampling commutator circuit 30 as hereinbefore described. The anode of the right triode of tube SQ*a* becomes more positive at the end of each signal code pulse position; and the right anode of tube SQ*a* is connected through differentiating condenser 390 to the left grid of tube CPG*a*. The left triode of tube CPG*a* is thereby energized each time thereafter that the potential of the left grid is raised to just below cut-off by the application of a positive voltage to conductor 305, such a pulse being applied to conductor 305 in the commutator sampling circuit 30 responsive to the fifth timing pulse applied to conductor 303, as hereinbefore described. Thus, the left triode of tube CPG*a* is energized at the end of every fifth timing pulse transmitted over conductor 303 to the sampling commutator circuit 30 and a positive pulse is thereby transmitted from the alternative decoder control circuit **29*a* over conductor 296 to the digit steering circuit 31, in the same manner as in the case of decoder control circuit 29**. The tubes STL*a*, SFF*a* and C1 are reset to normal by a reset pulse received over conductor 219 in the same manner that the corresponding tubes in decoder control circuit 29 are reset, as hereinbefore described.

In a system in which calls are extended through one or more intermediate offices to a terminating office and only part of the signal information transmitted by the signal transmitter in the originating office is used at each intermediate office and part at the terminating office, for instance in a nation-wide dialing system, the signal receivers at each intermediate and the terminating offices all receive the entire information transmitted but use only that part of the information needed to perform the switching operations at the office in question. However in such a case the signal receiver at the terminating office is the only one which is arranged to transmit the stop-sending signal; so that the signal transmitter at the originating office continues to operate until the stop signal is received from the terminating office.

What is claimed is:

1. In combination in a signaling system, a line adapted for use in transmitting signal current pulses, a plurality of digit registers each settable to register any one of a plurality of different code letters and numerical digit values, signal transmitting means at one end of said line for transmitting outgoing signals thereover comprising electrical commutative means for cyclically and repeatedly generating in succession a start signal current pulse, a synchronizing signal current pulse, and a plurality of digit signals each consisting of one of a plurality of different pulse codes, the particular pulse code to be transmitted for each digit signal being determined by the setting of the corresponding register, switching means actuated when the setting of said registers is completed to connect said signal transmitting means to one end of said line, signal receiving means at said one end of said line for receiving signals incoming over said line, and means actuated by said signal receiving means upon receipt of a stop signal consisting of a current pulse of a particular frequency for disconnecting said signal transmitting means from said line.

2. In combination, a line, means for seizing one end of said line, a plurality of digit registers connected to said line responsive to seizure of said one end of the line, means for setting said registers to register a plurality of letter code and numerical digits, each digit being any one of a plurality of different letters or numerical values, means operative in response to the setting of said registers for transmitting a seizure signal over said line, signal transmitting means at said one end of said line for cyclically and repeatedly transmitting signals over said line, said signals being in succession a start signal, a synchronizing signal and coded digit signals, one coded signal for each letter or numerical digit to be transmitted, the particular code for each digit being determined by the setting of the corresponding register, and means including signal receiving means associated with said one end of said line for stopping the transmission of signals by said signal transmitting means upon receipt of a signal incoming over said line to said one end of the line.

3. In combination, a line, means for seizing one end of said line, a plurality of digit registers connected to said line responsive to seizure of said one end of the line, means for setting said registers to register a plurality of letter code and numerical digits, each digit being any one of a plurality of different letters or numerical values, means operative in response to the setting of said registers for transmitting a seizure signal over said line, signal transmitting means for cyclically and repeatedly transmitting signals consisting of pulses of current of a particular frequency over said line, said signals being in succession a start signal consisting of a single pulse of predetermined duration, a synchronizing signal consisting of a single pulse of a shorter predetermined duration and coded digit signals each consisting of two pulses positioned in any two out of five pulse positions of equal duration, one coded signal for each letter or numerical digit to be transmitted, the particular code for each digit being determined by the setting of the corresponding register, and means including signal receiving means associated with said one end of said line for stopping the transmission of signals by said signal transmitting means upon receipt of a signal consisting of a pulse of current of a particular frequency incoming over said line to said one end of the line.

4. In a signal transmitter for cyclically and repeatedly transmitting carrier current signals, each cycle consisting of a start signal, a synchronizing signal, and a plurality of selective signals one for each digit of letter and/or numerical digit numbers, variably settable register means for registering the number to be transmitted, continuously operating pulse generating means for producing start and synchronizing pulses and for producing coded selective signal pulses under the control of said registers, carrier current generating and modulating means, gating means, digit stepping means for rendering said gating means operative to cyclically transmit said start, synchronizing and coded digit signal pulses to said modulating means in the order recited, and circuit means rendered effective when said registers have been set for closing the output circuit of said modulating means to effect signal transmission.

5. In combination in a signaling system, a line adapted for use in transmitting carrier current signals, a signal transmitter connected to one end of said line for cyclically and repeatedly transmitting carrier current signals, each cycle consisting of a start signal, a synchronizing signal, and a plurality of selective signals one for each digit of letter and/or numerical digit numbers, variably settable register means for registering the number to be transmitted, continuously opeating pulse generating means for producing start and synchronizing pulses and for producing coded selective signal pulses under the control of said registers, said start signal pulse being of predetermined duration, carrier current generating and modulating means, gating means, digit stepping means for rendering said gating means operative to cyclically transmit said start, synchronizing and coded digit signal pulses to said modulating means in the order recited, and circuit means rendered effective when said registers have been set for operatively connecting the output of said modulating means to said line to effect signal transmission over said line, and means for disconnecting the output of said modulator from said line to terminate signal transmission, said last-mentioned means comprising a signal receiver and means therein actuated by signal current of a particular frequency incoming thereto over said line.

6. In a signal transmitter for cyclically and repeatedly transmitting coded signal current pulses representing in succession a start signal, a synchronizing signal, and a plurality of coded selective signals, a plurality of variably settable devices one for each letter and numerical digit of a letter code and number to be transmitted, a timing pulse generator for generating timing pulses at a desired rate, coding stepper means controlled by the timing pulses for cyclically applying corresponding signal pulses to each of said settable devices in succession, gating means for transmitting signal pulses in accordance with the setting of each of said devices, digit stepper means controlled by said coding stepper means and controlling said gating means to cyclically and repeatedly effect transmission of the signal pulse code for the start signal, the synchronizing signal and each of the letter code and numerical digits of the number to be transmitted.

7. In a signal transmitter for cyclically and repeatedly transmitting coded signal current pulses representing in succession a start signal, a synchronizing signal and a plurality of coded selective signals, a plurality of variably settable devices one for each letter and/or numerical digit to be transmitted, a timing pulse oscillator generating timing pulses at a desired rate, coding stepper means comprising a multistage reentrant electronic tube ring, one stage for each time element of a code cycle, electronic means controlled by said coding stepper means for applying voltage pulses to each of said devices in succession, an electronic gate for each signal to be transmitted, digit stepper means comprising a multistage reentrant electronic tube ring controlled by said digit stepper means to render each of said gates conductive in succession, thereby to effect the transmission of a start signal current pulse of predetermined duration, a synchronizing signal current pulse, and in succession a set of coded signal current pulses corresponding to each letter and numerical digit of the number to be transmitted.

8. In combination in a signaling system, a line adapted for use in transmitting electrical signals, signal receiving means connected to one end of said line, said signal receiving means comprising a plurality of registers one for each letter and numerical digit of a letter and/or numerical digit number transmitted over said line, means for receiving each signal current pulse transmitted over said line, means for recognizing a start signal current pulse, means rendered effective by the synchronizing signal current pulse following a recognized start signal to direct succeeding selective coded signal current pulses to said registers in succession, and signal transmitting means connected to said one end of the line rendered effective responsive to a complete setting of said registers to transmit a stop signal current pulse over said line.

9. In combination in a signaling system, a line adapted for use in transmitting electrical signals, signal receiving means connected to one end of said line, said signal receiving means comprising a plurality of registers one for each letter and numerical digit of a letter and/or numerical digit number transmitted over said line, means for receiving each signal current pulse transmitted over said line, means for recognizing a start signal current pulse, means rendered effective by the synchronizing signal current pulse following a recognized start signal to direct succeeding selective coded signal current pulses to said registers in succession, means for checking said registers to determine whether each register is set according to one of the pulse codes used in transmitting said selective signals, and signal transmitting means connected to said one end of the line and controlled by said checking means for transmitting a stop signal current pulse over said line following the setting of all of said registers.

10. In combination in a signaling system, a line, signal receiving means connected to one end of said line, said receiving means comprising a plurality of letter and/or numerical registers variably settable according to a predetermined pulse code, signal receiving means for receiving signal current pulses incoming over said line, means for measuring the length of signal current pulses incoming to said signal receiving means and for recognizing a start signal current pulse of predetermined duration, control means actuated by a synchronizing signal current pulse following a recognized start signal, and means rendered effective by said control means to direct succeeding selective coded signal current pulses to said registers in succession.

11. In a signal receiver to which signal current pulses are cyclically applied including a start signal current pulse of predetermined duration, a synchronizing signal current pulse and selective coded signal current pulses in the order named beginning any place in the cycle, registers for registering the selective coded signal current pulses, one register for each selective signal in a cycle, an oscillator for generating timing pulses at a predetermined rate, means controlled by said timing pulses for measuring the duration of applied signal current pulses, means responsive to each signal current pulse received prior to a start signal and responsive to said start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, and means rendered operative by said synchronizing signal responsive means and controlled by timing pulses from said oscillator for directing the succeeding signal current pulses of each selective signal to operate said registers in succession.

12. In a signal receiver to which signal current pulses are cyclically applied including a start signal current pulse of predetermined duration, a synchronizing signal current pulse and selective signals each consisting of any one of a plurality of different current pulse codes in the order named beginning any place in the cycle, registers for registering the selective coded signal current pulses, one register for each selective signal in a cycle, an oscillator for generating timing pulses at a predetermined rate, means controlled by timing pulses for measuring the duration of applied signal current pulses, means responsive to each signal current pulse prior to a start signal and responsive to the first applied start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, a sampling electronic commutator and an electronic digit steering means jointly controlling said registers, means rendered effective by operation of said synchronizing signal responsive means for transmitting timing pulses to step said commutator and thereby enable the response of said registers during each pulse position of a coded selective signal in succession, and means rendered effective at the end of each cycle of said commutator for advancing said digit steering means thereby to direct the coded signal pulses for each selective signal to each register in succession.

13. In a signal receiver to which signal current pulses are cyclically applied including a start signal current pulse of predetermined duration, a synchronizing signal current pulse and selective signals each consisting of any of a plurality of different current pulse codes in the order named beginning any place in the cycle, registers for registering the selective coded signal current pulses, one register for each selective signal in a cycle, an oscillator for generating timing pulses at a predetermined rate, means controlled by timing pulses for measuring the duration of applied signal current pulses, means responsive to each signal current pulse prior to a start signal and responsive to the first applied start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operating of said oscillator and for enabling the operation of said synchronizing signal responsive means, a sampling electronic commutator and an electronic digit steering means jointly controlling said registers, means rendered effective by operation of said synchronizing signal responsive means for transmitting timing pulses to step said commutator and thereby enable the response of said registers during each pulse position of a coded selective signal in succession, means rendered effective at the end of each cycle of said commutator for advancing said digit steering means thereby to direct the coded signal pulses for each selective signal to each register in succession, and checking means for checking the response of all registers to determine whether each register is set according to some one of said different pulse codes.

14. In combination in a signaling system, a line, a signal receiver according to claim 12 connected to one end of said line, and signal transmitting means controlled by said checking means for transmitting a stop signal current pulse of a particular frequency over said line.

15. In a signaling system according to claim 3, a signal receiver, means at the other end of said line actuated by said seizure signal for connecting said signal receiver to said other end of the line, said signal receiver comprising registers for registering the selective coded signal current pulses, one register for each selective signal in a cycle, an oscillator for generating timing pulses at a predetermined rate, means controlled by timing pulses for measuring the duration of signal current pulses, means responsive to each signal pulse prior to a start signal and responsive to a start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, a sampling electronic commutator and an electronic digit steering means jointly controlling said registers, means rendered effective by operation of said synchronizing signal responsive means for transmitting timing pulses to step said commutator and thereby enable the response of said registers during each pulse position of a coded selective signal in succession, and means rendered effective at the end of each cycle of said commutator for advancing said digit steering means thereby to direct selective coded signal pulses to each register in succession, checking means for checking the response of each register to determine whether each register is set according to some one of said different pulse codes, and signal transmitting means controlled by said checking means for transmitting a stop signal current pulse of said particular frequency.

16. In a signaling system according to claim 5, a signal receiver connected to the other end of said line, said signal receiver comprising registers for registering the selective coded signal current pulses, one register for each selective signal in a cycle, an oscillator for generating timing pulses at a predetermined rate, means controlled by timing pulses for measuring the duration of signal current pulses, means responsive to each signal pulse prior to a start signal and responsive to a start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, a sampling electronic commutator and an electronic digit steering means jointly controlling said registers, means rendered effective by operation of said synchronizing signal responsive means for transmitting timing pulses to step said commutator and thereby enable the response of said registers during each pulse position of a coded selective signal in succession, and means rendered effective at the end of each cycle of aid commutator for advancing said digit steering means thereby to direct selective coded signal pulses to each register in succession, checking means for checking the response of each register to determine whether each register is set according to some one of said different pulse codes, and signal transmitting means controlled by said checking means for transmitting a stop signal current pulse of said particular frequency.

17. In a signaling system, a line adapted for use in transmitting electrical signals, a signal transmitter according to claim 4 connected to one end of said line, signal receiving means connected to the other end of said line, said signal receiving means comprising a plurality of registers one for each letter and numerical digit of a letter and/or numerical digit number transmitted over said line, means for receiving each signal current pulse transmitted over said line, means for recognizing a start signal current pulse and means rendered effective by the succeeding synchronizing signal current pulse to direct succeeding selective coded signal current pulses corresponding to said registers in succession, signal transmitting means connected to said other end of the line for transmitting a stop signal current pulse over said line following the setting of each of said registers, and means connected to said one end of the line actuated by said stop signal for stopping the transmission of said signals by said transmitter.

18. In a signaling system a line adapted for use in transmitting electrical signals, a signal transmitter according to claim 7 connected to one end of said line, and a signal receiver connected to the other end of said line, said signal receiver comprising registers for registering the selective coded signal current pulses, one register for each selective signal in a cycle, an oscillator for generating timing pulses at a predetermined rate, means controlled by said timing pulses for measuring signal current pulses, means responsive to each signal current pulse received prior to a start signal and responsive to a start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, and means rendered operative by said synchronizing signal responsive means and controlled by timing pulses from said oscillator for directing the succeeding selective coded signal current pulses to operate said registers, one selective code to each register in succession.

19. In a signaling system a line adapted for use in transmitting electrical signals, a signal transmitter according to claim 7 connected to one end of said line, a signal receiver connected to the other end of said line, said signal receiver comprising registers for registering the selective coded signal current pulses, one register for each selective signal in a cycle, an oscillator for generating timing pulses at a predetermined rate, means controlled by timing pulses for measuring the duration of signal current pulses, means responsive to each signal pulse prior to a start signal and responsive to a start signal pulse for starting said oscillator, start signal responsive means actuated by said measuring means if a measured signal current pulse is of said predetermined duration, synchronizing signal responsive means, means rendered effective by the actuation of said start signal responsive means for maintaining the operation of said oscillator and for enabling the operation of said synchronizing signal responsive means, a sampling electronic commutator and an electronic digit steering means jointly controlling said registers, means rendered effective by operation of said synchronizing signal responsive means for transmitting timing pulses to step said commutator and thereby enable the response of said registers during each pulse position of a coded selective signal in succession, and means rendered effective at the end of each cycle of said commutator for advancing said digit steering means thereby to direct selective coded signal pulses to each register in succession, signal transmitting means connected to said other end of said line for transmitting a stop signal current pulse of a particular frequency over said line, and means connected to said one end of the line actuated by said stop signal current pulse for stopping the transmission of signals over said line by said signal transmitter.

20. In combination in a signaling system according to claim 9, means rendered effective by said checking means in the event the setting of one or more of said registers is not in accordance with one of said pulse codes for restoring the signal receiving means to normal.

21. In combination, an electronic valve having at least cathode and grid electrodes and one other electrode, means for applying a signal to said grid electrode, a cathode impedance coupled to said cathode electrode, means for utilizing the voltage developed across said impedance, and controllable means for applying a control potential to said other electrode, thereby to cause said valve to conduct in response to the application of said potential and to cause said signal to produce a voltage across said impedance wherein the controllable means includes the anode-cathode path of an electron discharge device structure connected in series between a source of unidirectional potential and the said other electrode of the electronic valve.

22. In a gating circuit, an electronic valve having at least cathode and grid electrodes and one other electrode, means for applying a signal to be gated to said grid electrode, a cathode impedance coupled to said cathode electrode, means for utilizing the voltage developed across said impedance, and controllable means for applying a control potential to said other electrode, thereby to cause said valve to conduct in response to the application of said potential, said last-named means including the anode-cathode path of an electron discharge device structure connected in series between a source of unidirectional potential and the said other electrode of the electronic valve.

23. In a gating circuit, an electronic valve having at least cathode and grid electrodes and one other electrode, means for applying a signal to be gated to said grid electrode, a cathode impedance coupled to said cathode electrode, means for utilizing the voltage developed across said impedance, an electron discharge device structure having an anode, a cathode and a control electrode, means coupling the anode-cathode path of said structure in series between a source of unidirectional potential and the said other electrode of the electronic valve, and means for applying a control voltage to said control electrode.

References Cited in the file of this patent

UNITED STATES PATENTS

| | | |
|---|---|---|
| 1,881,273 | Haigh et al. | Oct. 4, 1932 |
| 2,211,020 | Marrison | Aug. 13, 1940 |
| 2,250,101 | Hubbard | July 22, 1941 |
| 2,257,568 | Mathes | Sept. 30, 1941 |
| 2,492,136 | Deloraine | Dec. 27, 1949 |